United States Patent [19]
Bangerter

[11] Patent Number: 6,057,674
[45] Date of Patent: *May 2, 2000

[54] ENERGY SAVING POWER CONTROL SYSTEM

[75] Inventor: Fred F. Bangerter, Apopka, Fla.

[73] Assignee: Ultrawatt Integrated Systems, Inc., Fort Meyers, Fla.

[*] Notice: This patent is subject to a terminal disclaimer.

[21] Appl. No.: 08/900,626

[22] Filed: Jul. 25, 1997

Related U.S. Application Data

[63] Continuation of application No. 08/491,974, Jul. 21, 1995, Pat. No. 5,652,504, which is a continuation of application No. 08/156,200, Nov. 22, 1993, Pat. No. 5,583,423.

[51] Int. Cl.⁷ ...................................................... G05F 1/44
[52] U.S. Cl. ........................ 323/211; 323/239; 323/241; 323/322
[58] Field of Search .................................. 363/34, 36, 37, 363/39, 40, 44, 89; 323/209, 211, 239, 241, 299, 300, 301, 319, 320, 322, 325, 326, 349, 351, 352

[56] References Cited

U.S. PATENT DOCUMENTS

| | | | |
|---|---|---|---|
| 4,434,358 | 2/1984 | Apfelbeck et al. | 323/209 |
| 4,719,402 | 1/1988 | Brennen et al. | 323/211 |
| 4,831,508 | 5/1989 | Hunter | 363/44 |
| 4,879,624 | 11/1989 | Jones et al. | 361/65 |
| 4,933,798 | 6/1990 | Widmayer et al. | 323/239 X |
| 4,956,599 | 9/1990 | Nishizawa et al. | |
| 5,519,311 | 5/1996 | Widmayer | 323/319 |
| 5,652,504 | 7/1997 | Bangerter | 323/329 |

Primary Examiner—Jessica Han
Attorney, Agent, or Firm—Brinks Hofer Gilson & Lione

[57] ABSTRACT

Apparatus and methods for AC power regulation primarily intended for inductive loads (e.g., fluorescent lights, motors, etc.) which provide substantial reduction in power consumption while also providing a leading power factor, reduced harmonic distortion, reduced crest factor and reduced noise. The system is self-adjusting for a wide range of loads and can reduce power consumption by 25 percent in lighting loads while producing minimal reduction in light output. The system utilizes a Triac and parallel capacitor bank in series with the load. The Triac is turned on in response to a near-zero differential voltage measured across the Triac and is turned off near the peak of each AC half cycle by shunting current around the Triac. The capacitor absorbs the inductive turn-off voltage spike caused by the collapsing magnetic field in the ballast at the instant of Triac turn-off. This energy, in turn, provides longer on-period for the lamp, thereby permitting more light and increased operating efficiency. The turn-off time is adjusted to regulate power at a reduced level responsive to line voltage, load current and load power-sense signals.

15 Claims, 16 Drawing Sheets

ENERGY SAVING POWER CONTROL SYSTEM

This is a continuation of application Ser. No. 08/491,974 filed on Jul. 21, 1995, now U.S. Pat. No. 5,652,504 the entire contents of which are incorporated herein by reference. Application Ser. No. 08/491,974 is a continuation of Ser. No. 08/156,200 which was filed on Nov. 22, 1993 and issued as U.S. Pat. No. 5,583,423 on Dec. 10, 1996.

TECHNICAL FIELD

This invention relates generally to the field of electronic power regulation and control; and, more specifically, to a power regulation apparatus and method for reducing energy consumption of a load, particularly inductive loads such as fluorescent lights and motors, while simultaneously shifting the power factor toward a leading reflected power factor, and maintaining low line harmonic distortion, low line crest factor, and low line noise.

BACKGROUND ART

A variety of AC power regulating circuits are known in the art in which AC power to a load (e.g., fluorescent lamps, motors, etc.) is regulated through control of an AC electronic switch (e.g., a thyristor) interconnecting the source of the AC power and the load. Many of these systems use some form of feedback control system to sense the load power. This information is then used to advance or retard the time relative to the initial zero crossing that the electronic switch is triggered into conduction during each half cycle of the AC power cycle. Thus, the device is turned on later in the cycle to reduce power and earlier to increase power. Once activated, the electronic switch typically turns off automatically thereby blocking current to the load when the load current reverses direction (i.e., at the zero crossing) as illustrated in FIG. 1A. For example, some prior art systems utilize a triac as an electronic switch because of its bi-directional conduction and high power characteristics. However, a triac only turns off when the current through the triac drops to zero. Thus, to decrease or increase the power to the load, the trigger phase angle is advanced or retarded and the portion of each half wave of AC input power which is applied to the load through the switch is thereby decreased or increased.

Power regulation of this type results in conduction occurring primarily during the later part of each half cycle of the AC power. This tends to cause an inductive (lagging) power factor, generates harmonic distortion and noise spikes reflected into the power line and causes a high crest factor. Such lagging power factors decrease power line efficiency (i.e., increase power line current for a given load power consumption) and frequently results in increased electric utility rates to the user. In addition, because current does not flow from the AC source during the time the electric switch is turned off, substantial harmonic distortion and noise is reflected into the power line which can interfere with the operation of sensitive electronic equipment.

In another type of prior art power regulation circuit, an electronic switch is turned on and off several times during each half cycle to control the current to the load, as illustrated in FIG. 1B. Inductive energy is dissipated by switching a short circuit across the load when the electronic switch is turned off. This type of circuit also can produce or aggravate an inductive power factor, and generates harmonic distortion, noise, and a high crest factor on the AC power line. Thus, EMI and RFI filtering is required.

In either type of prior art regulating circuit, current from the AC power line to the load is interrupted during a substantial portion of each AC half cycle which can result in large surge currents. This large surge current can cause ballast temperature to rise excessively causing early failure or actual breakdown with acrid smoke generation. In addition, when used to power lighting loads, such as fluorescent lights, at a reduced power level to conserve power, these circuits cause a large reduction in light output.

It is, accordingly, an object of the present invention to provide a novel, economic and reliable method and apparatus for AC power regulation which permits reduced power consumption while providing a leading power factor and minimizing the reflected harmonic distortion, noise spikes and crest factor on the AC power line.

It is another object of the invention to provide a novel method and apparatus for AC power regulation which is self-adjusting for a wide range of loads.

It is another object of the invention to provide a novel method and apparatus for AC power regulation which provides a 25 percent reduced power consumption for fluorescent and other ballasted lighting loads without excessive light intensity loss while providing a leading power factor.

It is another object of the invention to provide a novel method and apparatus for AC power regulation utilizing a triac and a large parallel energy transfer capacitor substantially greater than 1 $\mu$f in which current continues to flow through the load via the capacitor during the time the triac is off so that current flows during substantially all of the AC cycle and a substantial portion of the power to the load is provided by current flowing through the capacitor. It is another object of the invention to provide a novel method and apparatus for AC power regulation utilizing a triac and a parallel switched energy transfer capacitor bank, wherein the triac is switched on shortly after the zero crossing of each half wave of the AC cycle and is switched off when an adequate power level is reached substantially before the next zero crossing to provide a leading power factor.

DISCLOSURE OF THE INVENTION

Briefly, according to one embodiment of the invention, there is provided an AC power regulation system for controlling power to a load having an input for coupling to an AC power source for supplying AC power having zero current crossing points at the end of each half cycle and wherein the system includes an output for coupling to the load. The system includes a triggerable switch coupled between the input and the output, a capacitor bank for supplying an energy transfer capacitance coupled in parallel with the triggerable switch, a circuit for generating power sense signals responsive to the load power, means for triggering the triggerable switch into a state of conduction, and means for switching the triggerable switch into a non-conductive state. Control circuitry is provided, coupled to the means for triggering and the means for switching, for generating control signals responsive to the power sense signals to control the means for triggering and the means for switching such that the electronic triggerable switch is triggered to a conduction state at a selected turn-on time after each zero crossing, and switched back to the non-conducting state at a selected turn-off time before the next zero crossing. The selected turn-off time is chosen to obtain a desired power level and to improve the reflected power factor responsive to power sense signals. In another embodiment, the capacitor bank comprises a bank of switchable capacitors and the control circuitry comprises circuitry for generating control signals to switch the switchable capacitors to obtain a selected capacitance responsive to the power sense signals.

In one embodiment of the invention, a monitor circuit is coupled across the triggerable switch to generate a differential voltage signal responsive to the voltage across the triggerable switch. A controller circuit operates to trigger the triggerable switch into a conductive state responsive to the differential voltage signal. In addition, the means for switching the triggerable switch into a non-conducting state may switch the triggerable switch by shunting current around the triggerable switch for a short period of time.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

BEST MODE FOR CARRYING OUT THE INVENTION

Figure 2:
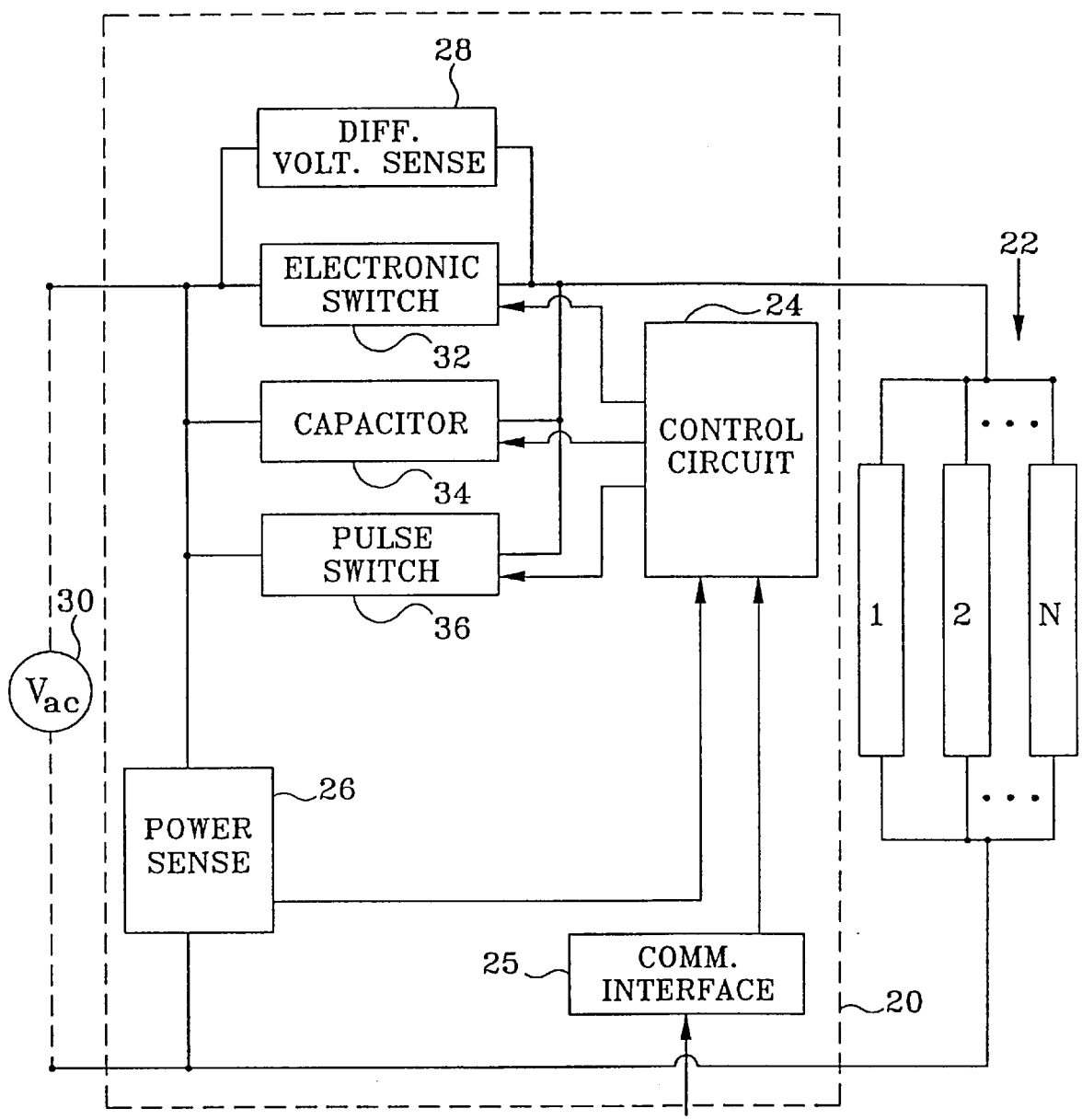
FIG. 2 is a generalized block diagram of one embodiment of a power regulation circuit in accordance with the present invention.
Figure 4:
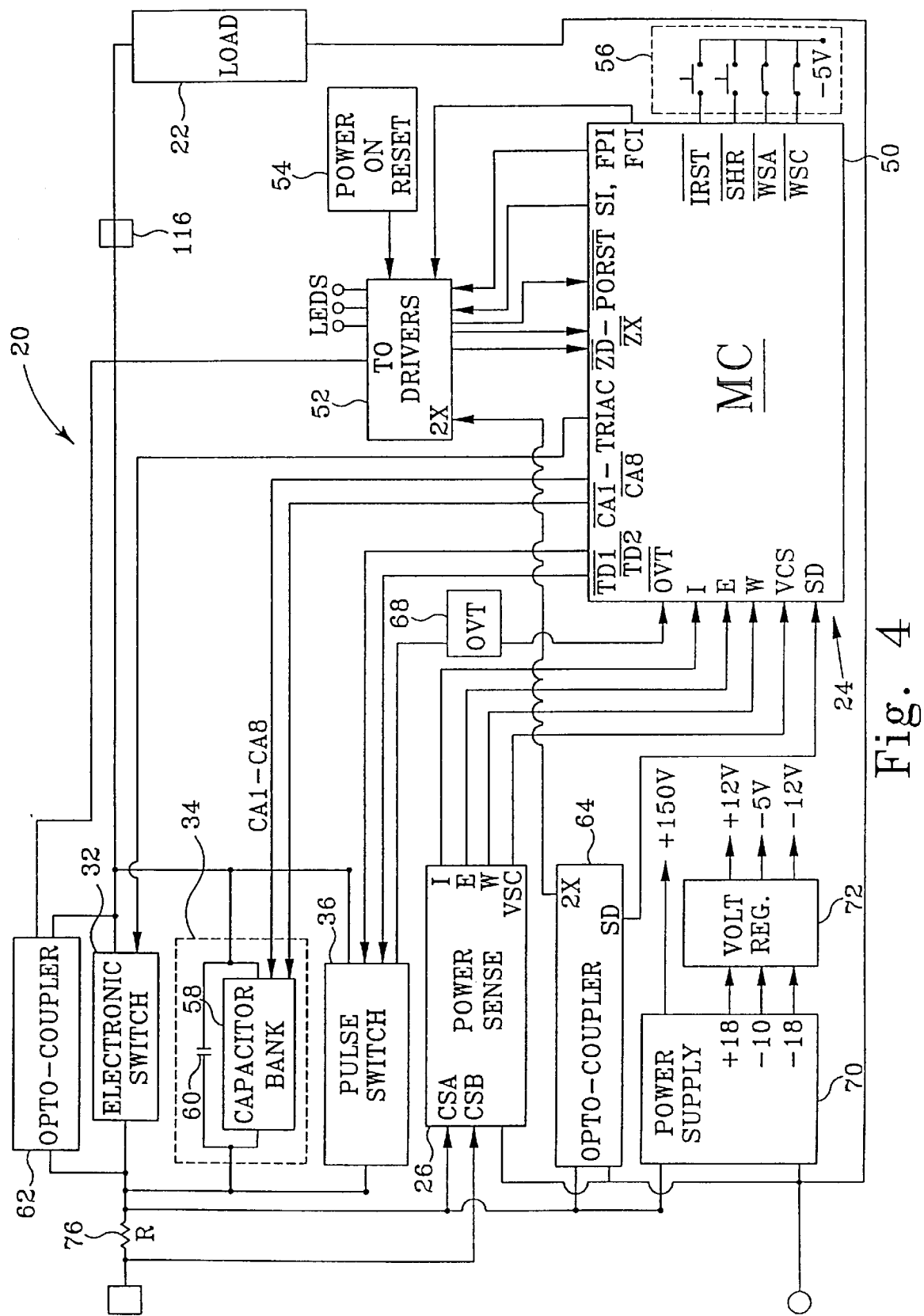
FIG. 4 is a detailed block diagram of one embodiment of a power regulation circuit of FIG. 2 in accordance with the invention.

Referring to FIG. 2, there is shown a generalized block diagram of one embodiment of a power regulation system 20 for conserving AC electrical power consumption by a load 22, typically made up of a plurality of individual devices according to the invention. The system 20 is particularly suited for supplying power to multiple light fixtures such as fluorescent, metal halide, mercury vapor, high pressure or low pressure sodium light fixtures, etc. The system 20 is controlled by a control circuit 24, which in the illustrated embodiment of FIG. 4 is a programmed microprocessor, but which may be any combination of analog and/or digital control circuitry capable of generating the required control signals. The control circuitry 24 may also include a communication interface 25 to permit external communications with the control circuit 24 (e.g., a serial RS-232 communications interface). Where external communications are involved, the system 20 may include suitable electrical isolation for the communication lines, such as use of optocouplers or other isolation techniques well known in the art. The control circuitry 24 is responsive to sense signals coupled from a power sensing circuit 26 in series with the AC power source 30, and to a differential voltage signal coupled from a differential voltage sense circuit 28, as shown. The power sensing circuit 26, in the illustrated embodiments of FIGS. 4–13, senses the line voltage and current, and derives power value by multiplying voltage and current in a multiplier circuit.

The differential voltage sense circuit 28 is coupled across an electronic triggerable switch 32 which is also in series with the AC power source 30 and the load 22. The differential voltage sense circuit 28 generates a signal indicative of approximately zero voltage across the electronic switch 32 which is used to determine the turn-on time of the electronic switch 32. The electronic switch 32 controls power to the load 22 under control of the control circuit 24. An energy transfer capacitor circuit 34 capable of supplying a large capacitance (e.g., substantially greater than 1 μf) and a pulse switch circuit 36 are coupled in parallel with the electronic switch 32, as shown. The electronic switch 32, capacitor circuit 34, and pulse switch circuit 36 are controlled by control signals coupled from the control circuit 24.

Figure 1A:
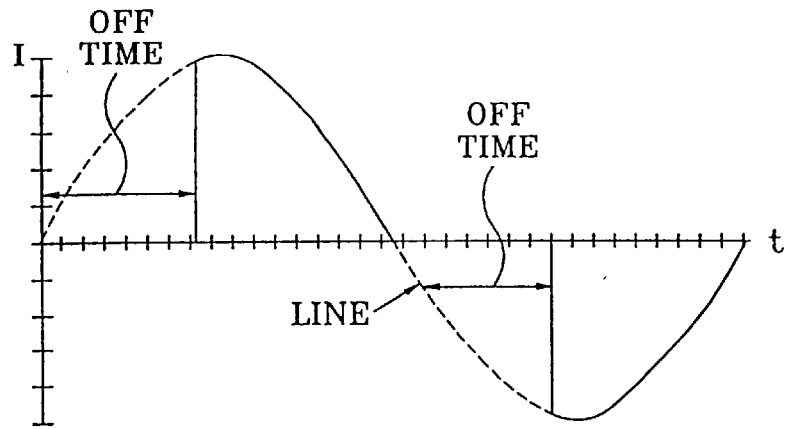
FIGS. 1A and 1B are waveforms of current through the load control device for prior art power regulation devices.
Figure 1B:
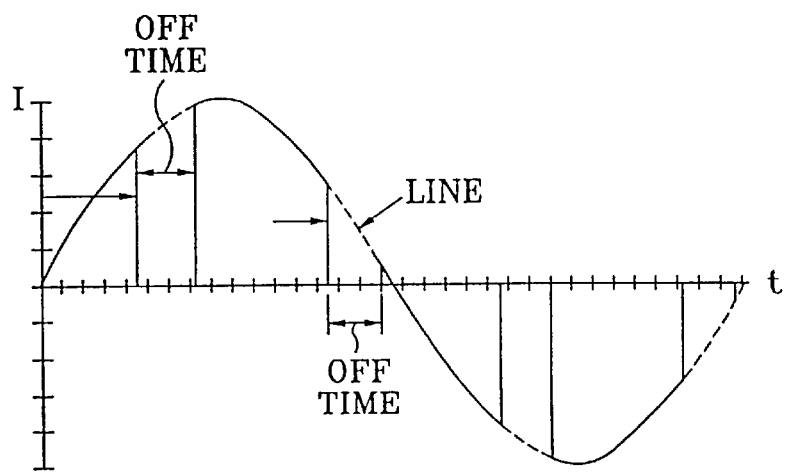
Figure 3:
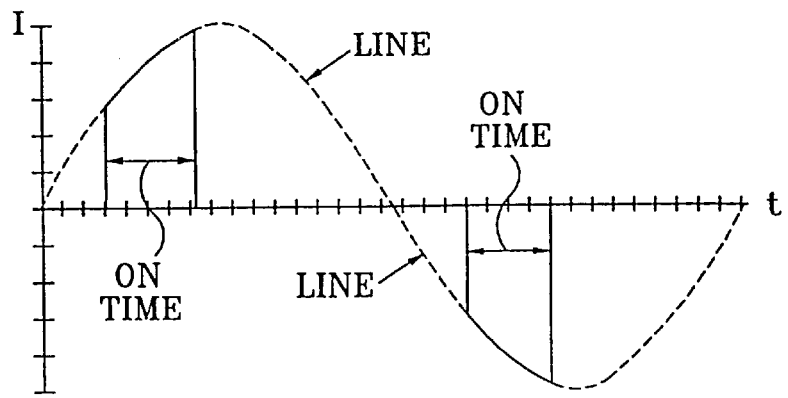
FIG. 3 is a waveform of the current through the load control switch for a power regulation circuit in accordance with the present invention.

In the system 20 of FIG. 2 in accordance with the invention, the electronic switch 32 is switched on in a unique manner. The electronic switch 32 is turned on by a signal from the control circuit 24 shortly after the zero crossing of the AC line voltage in response to detection by the differential voltage circuit 28 of a zero or near-zero voltage across the electronic switch 32. Consequently, electronic switch 32 is typically turned on during the first 15 to 40 degrees of each half cycle of the AC line voltage sine wave. The switch 32 is turned off thereby blocking current through it when the desired power level is reached, typically near the peak of each half cycle of the AC line voltage sine wave (i.e., near 90 and 270 degrees) instead of at the next zero crossing at the end of each AC half cycle. A typical example of resulting current through the switch 32 is illustrated by the waveform of FIG. 3 which differs dramatically from that of the prior art devices illustrated in FIGS. 1A and 1B. This switching is accomplished by activating the pulse switch 36 to shunt the load current around the electronic switch 32 for a brief period (e.g., 180 microseconds) to permit the electronic switch 32 to turn off. In this manner, the current conducted by the switch 32 thus can be largely confined to the first and third quadrant of the AC line voltage sine wave when it is desired to reduce power to the load. The pulse switch 36 is activated by a signal from the control circuit 24.

The capacitor circuit 34 prevents an excessive dv/dt from falsely firing the electronic switch 32, and stores inductive energy from the load when the electronic switch 32 is turned off. During a savings mode when power is reduced, the capacitor circuit 34 also permits substantial AC current to flow through the load when the electronic switch 32 has been turned off, the load 22 is still connected to the power line in series with the capacitor circuit 34 so that a substantial portion of the power to the load (typically, 40–50 percent of the total power in the illustrated embodiment for a ballasted lighting fixture load) is supplied through the capacitor circuit 34. The capacitor circuit 34 also permits selection of capacitance prior to entering the savings mode to match capacitance to the load under control of the control circuit 24 by means of a bank of switched capacitors.

This unique manner of triggering the turn-on of the switch 32 in response to a near-zero voltage together with the turn-off of the switch 32 at or near the peak of the AC line voltage half cycle shifts the power factor toward a leading power factor as seen by the AC power source. The energy transfer capacitor circuit 34 absorbs reactive voltage spikes caused by the collapsing magnetic field of inductive loads when the electronic switch 32 is turned off and provides additional power factor lead, reduction of harmonic distortion, reduced crest factor, and reduced noise spikes reflected into the power line. Thus, the system 20 either reflects a leading power factor or, at a minimum, shifts a lagging power factor so as to reduce the amount of lag thereby shifting toward a leading power factor (i.e., closer to a pure resistive power factor). In addition, the capacitor circuit 24 permits current to flow to the load when the switch 32 is turned off thereby extending lamp arc conduction time in each half-cycle of operation of lamps such as fluorescent lamps increasing the efficiency of the fixture and minimizing the light loss during reduced power operation. Optionally, additional switching circuitry in the capacitor circuit 34 permits selection of a range of capacitor values to permit dynamically matching the capacitance to the load type and current under the control of the control circuit 24. The leading power factor generated by the system 20 can be combined with undesirable lagging power factor conditions caused by other loads such as motor-driven appliances and equipment (e.g., air conditioners) to provide a more desirable overall power factor.

The system 20 of FIG. 2 can be configured to use the inventive switching scheme together with the inventive capacitor circuit 34 to provide large energy savings (25 percent in the savings mode in the illustrated embodiment of FIG. 4) while still providing a leading power factor by providing a selected reduction of power to the load under control of the control circuit 24. In this energy-saving mode, power reduction is accomplished primarily by controlling the point at which the electronic switch 32 is turned off, thereby controlling the portion of the AC cycle (i.e., the conduction angle) during which current is permitted to flow through the electronic switch 32.

In one embodiment, the system 20 can operate in four operational modes. An initial power turn-on mode begins when the main power is switched on and ends when the control circuit 24 is fully initialized. During this mode, the electronic switch 32 is held off and only minimal current through the capacitor 34 is supplied to the load. When the control circuit 24 is fully operational, it generates a control signal to turn on the switch 24 each time the zero or near-zero voltage across the switch 32 is detected by differential voltage sensor 28. As a result, the load is supplied with full power.

The power-on mode is followed by a warm-up mode for a selected period of time (e.g., selected based upon load type and warm-up requirements) during which the control circuit 24 samples and digitizes a power measurement, an rms current measurement and an rms voltage measurement for successive sample periods from the power sense circuit 26. These values are compared to the same measurement from the two prior samples until a stable average value is obtained. Final measured values are stored when the current measurement is sufficiently stable for a predetermined period of time (e.g., 32 seconds). This final value is used to select the desired amount of capacitance for the capacitor circuit 34. The final average power is stored and 75 percent of that value is calculated and stored as the target reduced power level that the system 20 will maintain during the savings mode.

After the warm-up period, a transition-to-savings mode is entered. The transition period is begun by switching the capacitor circuit 34 to bring its capacitance to the selected value and the conduction time of the switch 32 is then gradually shortened until the 75 percent calculated power level is reached. Once the system 20 is at equilibrium, the savings mode is entered in which the power savings is maintained and the system 20 tracks changes in load power, line voltage, and load current. Changes in power due to line voltage change or due to small current changes result in adjustment of the conduction time of the switch 24 to maintain the calculated power. If a large change in current (e.g., over 20 percent) occurs, the system circuit 22 will recycle to the warm-up mode where a new target reduced power and new capacitance level will be selected. The threshold for a large change in current is set to detect significant changes in load (i.e., addition or deletion of a fixture) while ignoring normal current variations and spikes. Thus, a typical value in the illustrated embodiment would be approximately 20 percent of full load.

Referring now to FIG. 4, there is shown a detailed block diagram of one embodiment of the power regulation system 20 according to the invention. The system 20 includes a control circuit 24 comprising a microcomputer 50 coupled to switch and jumper circuits 56 and driver circuits 52 to which is coupled a power-on reset circuit 54, as shown. The microcomputer 50 couples output control signals to the pulse switch circuit 36, to the capacitor circuit 34 composed of a switched capacitor bank 58 and a capacitor 60, and to the electronic switch 32. Signals are coupled from an opto-coupler 62 which functions as a differential voltage sensor 28, and from opto-couplers 64 through the drivers 52 to the microcomputer 50. Signals are also coupled directly to the microcomputer 50 from the opto-couplers 64, the power sense circuit 26, and an over-voltage trip circuit (OVT) 68, as shown. In addition, a power supply 70 and voltage regulators circuit 72 provide +150 volt, +12 volt, -5 volt, and -12 volt power to the various circuits of the system 20. Also shown in FIG. 4 is a series resistor 76 in series with the AC line which is used by the sense circuit 26 for sensing line current.

Figure 5:
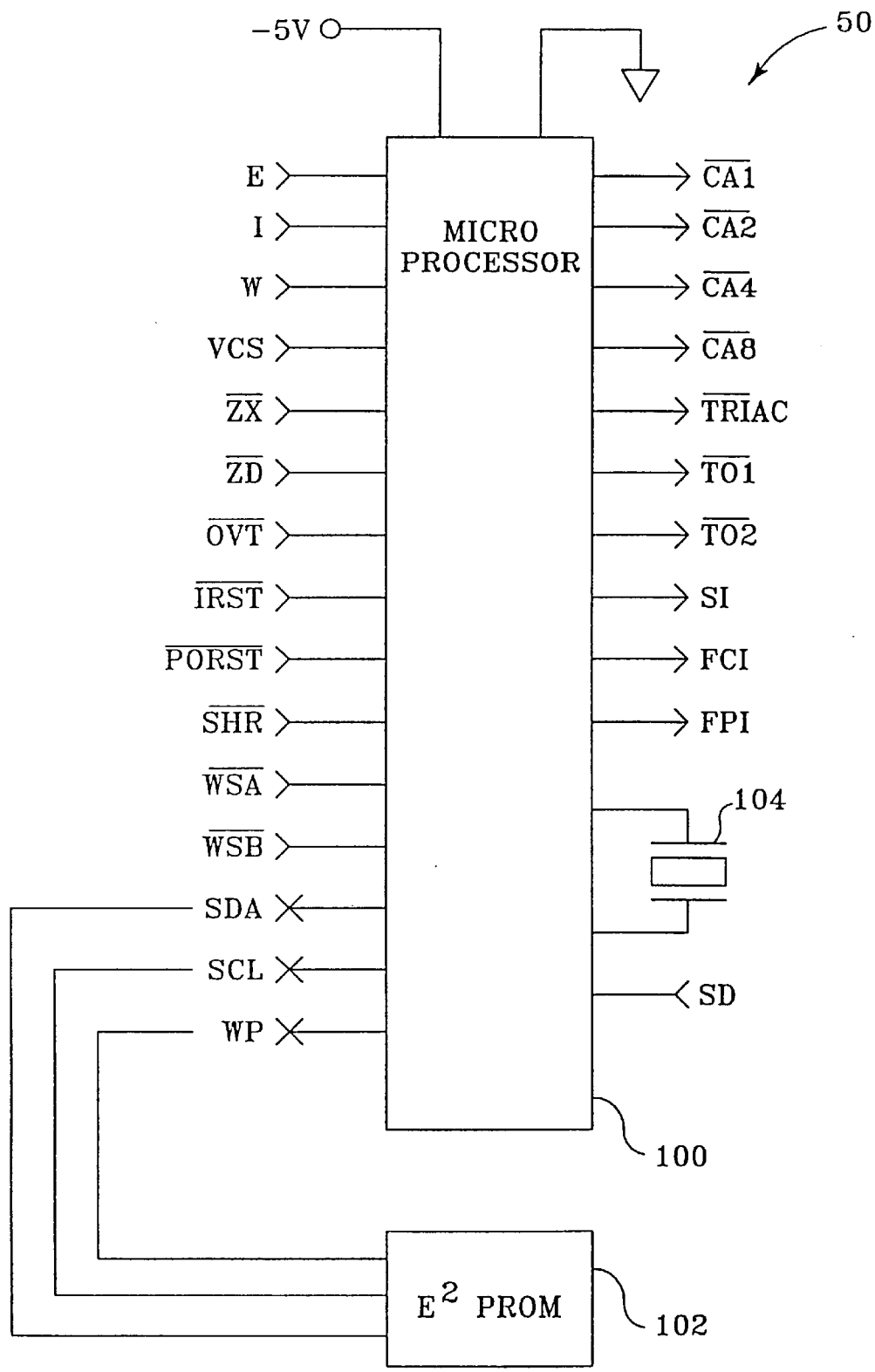
FIG. 5 is a detailed circuit diagram illustrating one embodiment of the microprocessor circuit of FIG. 4 according to the present invention.

FIG. 5 is a detailed circuit diagram illustrating one embodiment of the microcomputer 50 including a programmed microprocessor 100, 1K-bit EEPROM 102, and a 2.1 megahertz clock crystal 104. The microprocessor 100 (e.g., a MC68HC05 marketed by Motorola), which includes internal A/D converters (not shown), digitizes and accumulates voltage (E), current (I), and power (W) data, and receives other input signals, as shown. In addition, the microprocessor 100 performs calculations, stores the results of the calculations, and generates various control signals responsive to the input signals and calculations. The program for the microprocessor 100 is stored in internal memory. Forty-eight-hour burn-in data and 2160 hours of accumulated data can be stored in the EEPROM 102.

The input to the microprocessor 100 illustrated in FIG. 5 includes 13 input signals and a three-bit memory bus (SDA, SCL, WP) coupled to the EEPROM 102. In addition, there are ten output control signals from the microprocessor 100. The input signals include three signals to the A/D converter input ports which include E (voltage), I (current), W (power). The I signal is a variable current DC signal representative of the RMS AC current generated by the power sense circuit 26. The signal voltage I is derived from the current flowing through the resistor 76 in series with the AC line. The E signal is a variable voltage DC signal representative of the RMS line voltage generated by the power sense circuit 26. The voltage signal E is derived from the DC line voltage between line and neutral. The input W is a variable power DC signal generated by multiplying the AC voltage and current signals in a multiplier circuit prior to conversion to RMS DC values.

The rest of the input signals to the microprocessor 100 are input on ten I/O ports. The signal VCS is an adjustable voltage proportional to the load current which is used for the determination of the capacitor combination selection. $\overline{ZX}$ is a near-zero crossing logical low pulse generated by inverting a high pulse generated by the opto-coupler 64 each time the voltage sine wave crosses the zero voltage point. The $\overline{ZD}$ signal is a near-zero differential logical low pulse generated by inverting a high pulse generated by the opto-coupler 62 each time the voltage across the electronic switch 32 is below a predetermined threshold near zero. The signal $\overline{OVT}$ is the over-voltage trigger signal generated by the OVT circuit 68 which is normally a logic low and goes high whenever the peak positive voltage across the switch 32 exceeds 500 volts. The generation of this signal will cause the selection of the next larger capacitance and after three attempts will cause the microprocessor 100 to turn off the main electronic switch 32 and flash a fault condition LED. The $\overline{IRST}$ input signal is an internal reset signal which is generated by an internal switch of the switch and jumper circuit 56 which is used to shorten the warm-up period for production testing. The $\overline{PORST}$ signal is the power-on reset signal generated by the power-on reset circuit 54 which generates a logical high voltage signal a short delay period after power is turned on. The $\overline{SHR}$ signal is a 48-hour timer signal which is generated by activating the appropriate switch of switch and jumper circuit 56 as shown. The WSA and WSB signals are two signals from the jumper portion of circuit 56 which are used to select one of four warm-up time periods. A 48-hour enable signal is internally generated by the microprocessor 100 to enable the 48-hour reset function after the designated 48-hour period has elapsed. A 2160-hour enable signal is similarly generated. The SD signal is the sine direction signal generated by the opto-coupler 64 from which the processor selects the correct turn-off pulse phase.

There are ten digital control signals generated by the microprocessor 100 which control the various functions of the system 20. The $\overline{CA1}$, $\overline{CA2}$, $\overline{CA4}$ and $\overline{CA8}$ are signals coupled to the capacitor bank 58 which activate the appropriate capacitor combination to obtain the desired capacitance determined by the microprocessor 100. The $\overline{TRIAC}$ signal is a control signal which controls the main electronic switch 32 and is a low signal to turn the switch 32 on and a high when the switch 32 is to be off. The $\overline{T01}$ signal is a control signal which activates the pulse driver to generate a turn-off pulse during the positive half cycle and is a momentary low signal to turn off the electronic switch 32. The $\overline{T02}$ signal is the second turn-off signal which controls turn-off of the pulse driver during the negative half cycle and is a momentary low signal to turn-off pulse the electronic switch 32. The signal SI is the savings mode indicating signal which is coupled to an indicator LED to indicate when the system 20 is in the savings mode. The FCI signal is a fault condition indicating signal which turns on and flashes a fault-indicating LED when a fault condition occurs. Among the fault conditions detectable by the microprocessor 100 in the illustrated embodiment are: 1) repeated $\overline{OVT}$ signals; 2) ZD stays high; and 3) ZD stays low. The FPI signal is a full power indicator signal which turns an amber LED indicator when not in savings mode or on and off at a one-second rate when a 48-hour warm-up period is in progress, and at once every three-second rate when within the 2160-hour operating period. All three LED indicators flash when an overload condition occurs.

Figure 6:
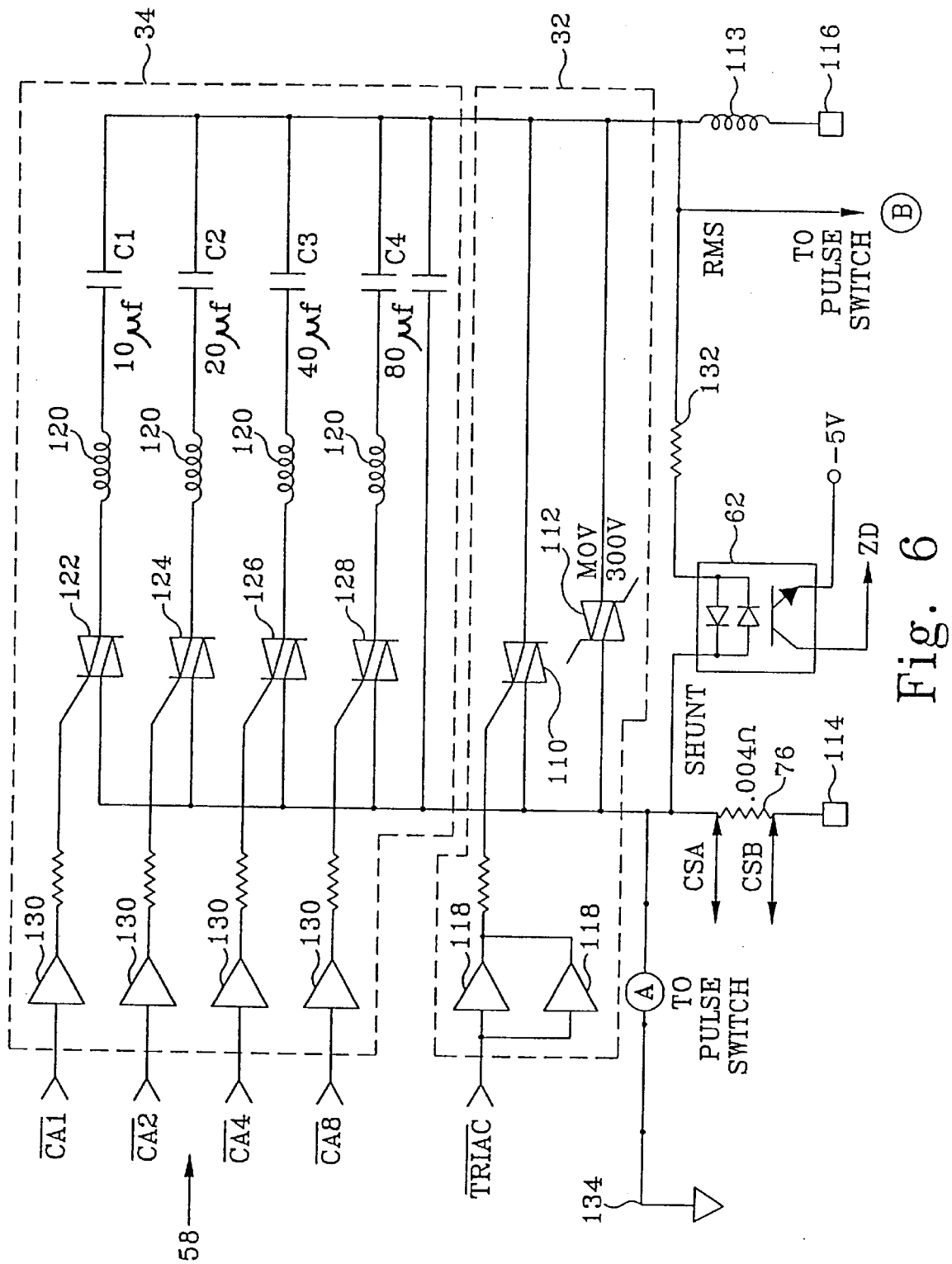
FIG. 6 is detailed circuit diagram illustrating one embodiment of the electronic switch, capacitor bank and optocoupler circuits of FIG. 4 according to the present invention.

FIG. 6 is a detailed circuit diagram illustrating one embodiment of the electronic switch 32, the capacitor circuit 34, and the opto-coupler 62. In the illustrated embodiment, the electronic switch 32 comprises a main Triac 110 (e.g., a Q6040 manufactured by Teccor) and a parallel varistor 112 connected in series with the sense resistor 76 between a line terminal 114 and a load terminal 116, as shown. The main Triac 110 is triggered by a $\overline{TRIAC}$ signal from the microprocessor 100 coupled to the gate of the main Triac 110 through a driver circuit 118 which amplifies the processor output signal to the current level required to drive the gate. Preferably, the specific triac chosen will have a low gate drive current requirement to minimize overall circuit power consumption during triac conduction for efficient operation. The varistor 112 protects the Triac 110 by limiting high voltage transients across the main Triac 110, and the inductor 113 limits peak current to protect the Triac 110 from di/dt breakdown.

Of course, it will be understood by persons of ordinary skill in the art that alternate forms of switching, such as power FETs, power transistors and the like, can be used in place of a triac. In an alternative embodiment, for instance, power FETs could replace the main Triac 110 and the pulse transformer 158, thereby coupling directly to the load. The relatively high voltage drop across the FETs, however, would generate greater power losses than the preferred circuit described herein.

The capacitor circuit 34 is coupled in parallel with the Triac 110 and comprises a bank 58 of four switchable capacitors C1 to C4, a capacitor C5, four inductors 120, four Triacs 122, 124, 126, 128 and four drivers 130 configured in a series—parallel network, as shown. The Triacs 122, 124, 126, 128 (e.g., four Q6015 triacs manufactured by Teccor) are switched respectively by selection signals $\overline{CA1}$, $\overline{CA2}$, $\overline{CA4}$, and $\overline{CA8}$ coupled from the microprocessor 100 through the drivers 130. The drivers 130 amplify the microprocessor 100 signals to the required current level to drive the gates of the Triacs 122, 124, 126, 128. The inductors 120 limit peak switching currents to protect the Triacs 122, 124, 126, 128 from di/dt breakdown. The capacitor C5 provides a minimum capacitance (e.g., 1 µf or greater) directly in parallel with the main Triac 110 to limit the rise time of the voltage across the main Triac 110 to prevent false turn-on due to excessive dv/dt. The capacitors C1–C4 in the illustrated embodiment are chosen to have substantial capacitance values which increase by a factor of two from one capacitor to the next. The capacitors C1–C4 should have sufficient capacitance to permit inductive current spikes to be absorbed to thereby limit the voltage peaks across the solid-state device of the system 20 to within their design limits (e.g., 500 v peaks in the illustrated embodiment) when the Triac 110 is switched. Thus, C1 will be substantially greater than 1 μf, and, typically, in the illustrated embodiment, at least 5 μf. (To prevent large surge current due to the parallel capacitance, the Triac 110 is switched on when the voltage across it is zero or near-zero.) For example, in one embodiment, C1 may be 10 μf, C2 would then be 20 μf, C3 would be 40 μf, and C4 would be 80 μf. This permits selection of total capacitance for the capacitor bank 58 in increments of 10 μf from zero to 150 μf by the appropriate combination of the selection signals $\overline{CA1}$–$\overline{CA8}$ coupled from the microprocessor 100. Other values of C1–C4 may be chosen to meet the requirements of the desired application.

The opto-coupler 62 shown in FIG. 6 in parallel with the main Triac 110 performs the function of the differential voltage sensor circuit 28 of FIG. 2. The opto-coupler 62 (e.g., a 2505-1 marketed by NEC) in the illustrated embodiment provides a positive pulse whenever the voltage across it is less than approximately three volts. This output pulse ZD is coupled to the microprocessor 100 through the driver inverter 52. When the pulse is provided to the microprocessor 100, it indicates that the voltage across the main Triac 110 is low enough to permit the Triac 110 to be switched on. A resistor 132 is in series with the opto-coupler 62 and limits the current through the opto-coupler 62 and limits the current through the opto-coupler bi-polar LED's to less than the maximum rated value (e.g., 0.04 amps). In addition, between the AC line terminal 114 and the main Triac 110 is shown the series resistor 76. This resistor provides a method of measuring the AC load current by supplying a small AC signal (e.g., approximately 100 millivolts RMS for a 25 amp RMS current) representative of the current flowing through it. The resistance value of this resistor 76 is kept low (e.g., 0.004 ohms) to minimize its power dissipation. Coupled to each end of the shunt resistor 76 are two signal lines which couple signals CSA and CSB to the power sense circuit 26. These signal lines are connected to the current sensing series resistor 76 by means of a conventional Kelvin connection. On the triac side of the series resistor 76 is indicated a hot ground 134. This is essentially the hot side of the AC line voltage after the series resistor 76, and is the reference point for all the circuitry shown in FIGS. 5–13.

Figure 7:
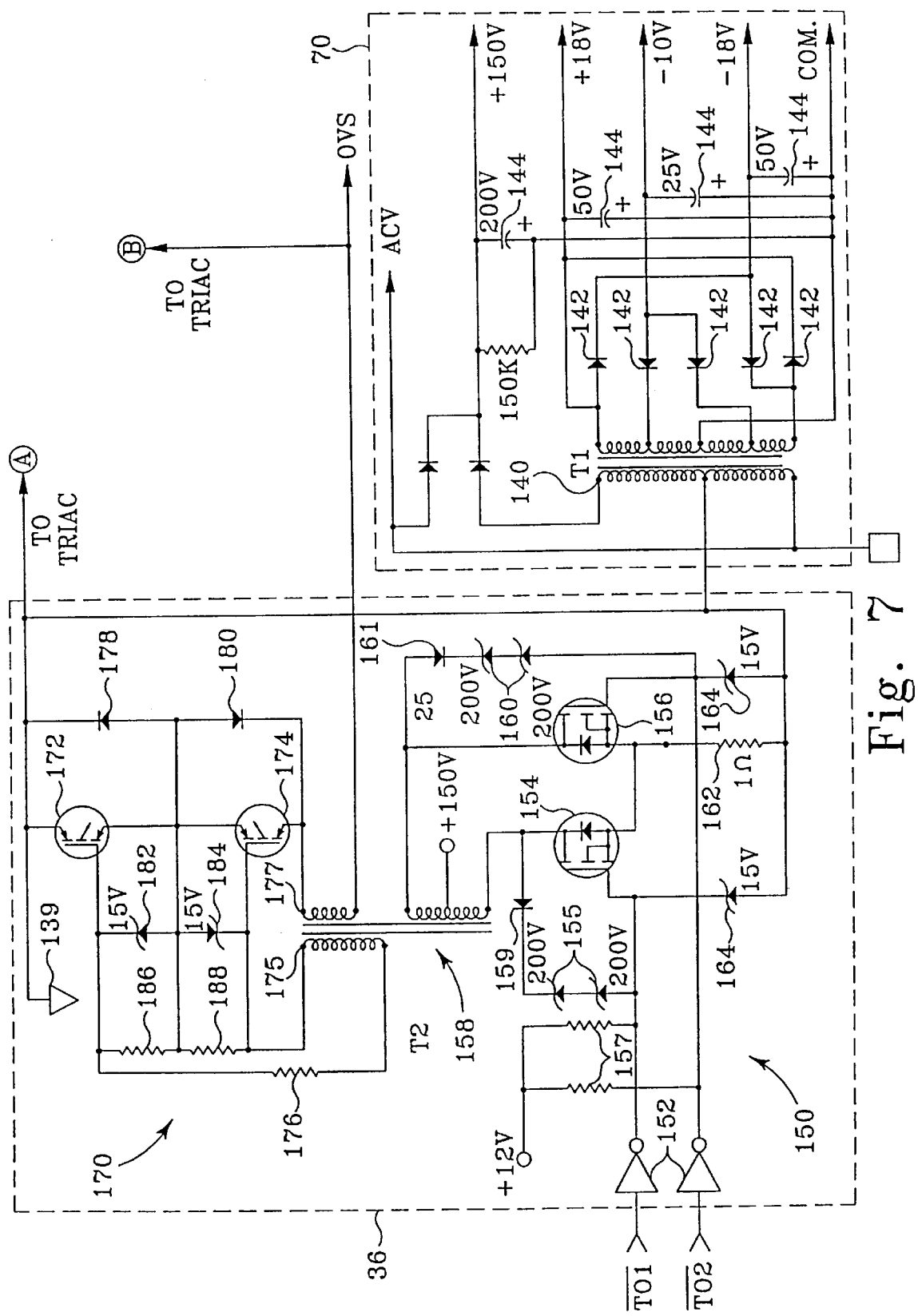
FIG. 7 is a detailed circuit diagram illustrating one embodiment of the pulse switch and power supply circuits of FIG. 4 according to the present invention.

Referring now to FIG. 7, there is shown a detailed circuit diagram of one embodiment of the pulse switch circuit 36 and the power supply 70 of FIG. 4. The power supply 70 comprises a power transformer 140 which provides appropriate voltages to rectifier diodes 142 and filter capacitors 144 to provide filtered voltages of +150 volt, +18 volt, –10 volt and –18 volt, as shown. The –18 volt, –10 volt and +18 volt filtered voltages are coupled to the regulator circuit 72 (see FIG. 13). The +150 volt filtered voltage is supplied to the pulse switch circuit 36 at the center tap terminal 146 of the transformer 158. The transformer 140 primary is coupled to the AC hot ground 134 and the neutral terminal. A signal line ACV is also coupled to the neutral terminal, as shown.

The embodiment of the pulse driver circuit 150 illustrated in FIG. 7 comprises a pulse driver circuit 150 and a transistor switch circuit 170, as shown. The pulse switch circuit 36 is activated by pulse control signals $\overline{T01}$ and $\overline{T02}$ coupled from the microprocessor 100 to inverter drivers 152. These pulse control signals $\overline{T01}$ and $\overline{T02}$ activate one of the pulse drive power field effect transistors (FET) 154, 156 to generate a high energy pulse through the primary of pulse transformer 158 coupled thereto. Some of this pulse energy activates the appropriate one of two insulated gate bi-polar switching transistors 172, 174 of the transistor switch circuit 170.

The pulse control signals $\overline{T01}$ and $\overline{T02}$ from the microprocessor 100 are coupled respectively through the drivers 152 to the gates of the power FET's 154, 156. Pull-up resistors 157 are coupled to the FET gates, as shown, to permit turn-on of the power FET's 154, 156 when the respective drivers 152 have a high output. Two back-to-back 200-volt zener diodes 155 along with a series rectifier diode 159 are coupled between the gate and drain of the FET 154, while two back-to-back 200-volt zener diodes 160 with a series rectifier diode 161 are similarly coupled between the gate and the drain of the FET 156, as shown. These diodes cause the alternate FET 154, 156 to turn on and attenuate undesirable spikes exceeding 400 volts when the other FET 154, 156 is turned on by one of the control signals $\overline{T01}$ and $\overline{T02}$. Also, coupled to the gate of each FET 154, 156 is a 15-volt zener diode 164 which protects the FET's 154, 156 by limiting their gate excursions. The drains of each FET 154, 156 are coupled to the pulse transformer 158 and the source of each FET 154, 156 is coupled to a common source resistor 162, as shown.

The FET's 154, 156 provide high voltage drive pulses to the pulse transformer 158 when turned on by one of the control signals $\overline{T01}$ and $\overline{T02}$. The pulse transformer 158 steps up the drive pulse current to more than 25 amperes while reducing the pulse voltage to about five volts peak, and provides a 25-volt peak pulse for gate switching of the transistors 172, 174 of the transistor switch circuit 170. The pulse transformer 158 is coupled to the switching transistors 172, 174 through a current limiting resistor 176 which protects zener diodes 182, 184. The zener diodes 182, 184 are coupled, respectively, to the gates of the transistors 172, 174. These diodes 182, 184 together with parallel resistors 186, 188 protect the gates of the transistors 172, 174 and switch the gate voltage to the respective transistors 172, 174. Two high-current rectifier diodes 178 and 180 are coupled, respectively, across the switching transistors 172, 174 and conduct current during switching while shunting reverse current away from the non-conducting switching transistor 172, 174.

Figure 14:
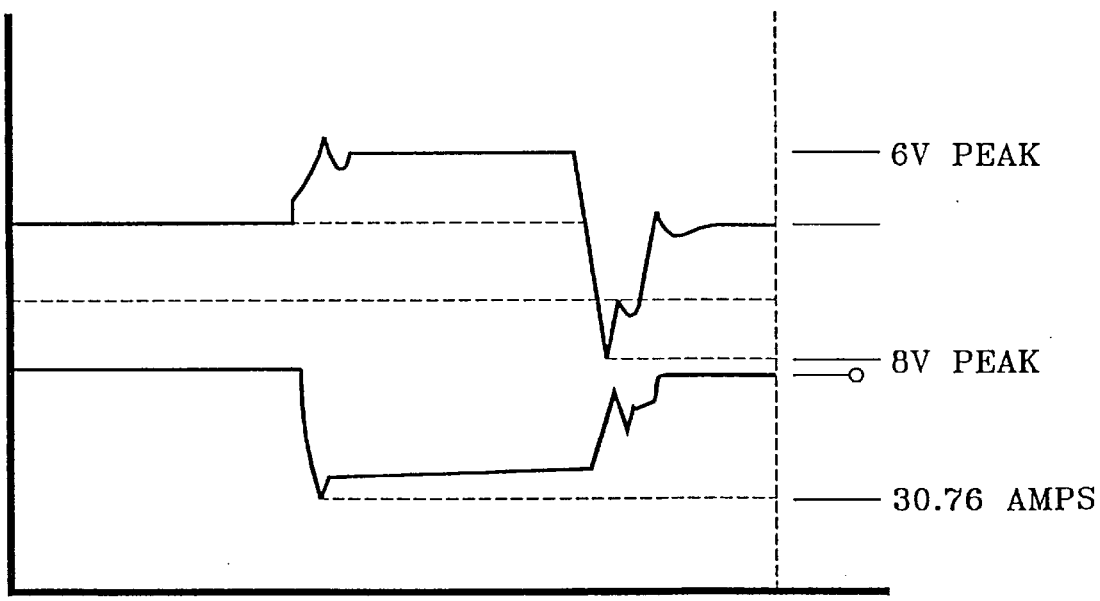
FIGS. 14 to 15 are exemplary waveforms for various signals occurring in the power regulation circuit of FIG. 4.

In response to a momentary low pulse on the $\overline{T01}$ or $\overline{T02}$ input, the respective transistor 154, 156 turns on thereby generating a high-voltage pulse across the primary of the pulse transformer 158. This generates a corresponding positive or negative switching pulse to the transformer low current secondary winding 175 which is coupled to the gates of the switching transistors 172, 174. This pulse turns on the appropriate transistor which then conducts a switching pulse from the transformer 158. The primary path of the switching pulse is from the transformer secondary 177 to one side of the main Triac 110 connected as shown via terminal B. An OVS signal line is also coupled from the terminal B to provide an OVS signal to the over-voltage trip circuit 68 (see FIG. 9). The other end of the transformer winding 177 is connected to the junction of the diode 180 cathode and the collector of the transistor 174. Depending upon the pulse polarity, the pulse current will travel through the transistor 174 and through the alternate high-current diode 178 to the other side of the Triac 110 connected via terminal A. Alternatively, for the opposite polarity pulse, current travels through the diode 180 and through the transistor 172. In both instances, the result is a large current pulse (e.g., 25 amperes) which shunts the load current around the Triac 110 for a short period (e.g., approximately 180 microseconds in the illustrated embodiment) permitting the Triac 110 to turn off. An example of the positive voltage pulse and corresponding negative current pulse generated by the pulse switch circuit 36 for the positive half cycle is illustrated in FIG. 14. The upper curve illustrates the positive voltage pulse and the lower curve is the current pulse. When the pulse stops and the Triac 110 has turned off, current continues to flow through the load from the power line through the capacitor circuit 34. (See FIG. 4.)

Figure 8:
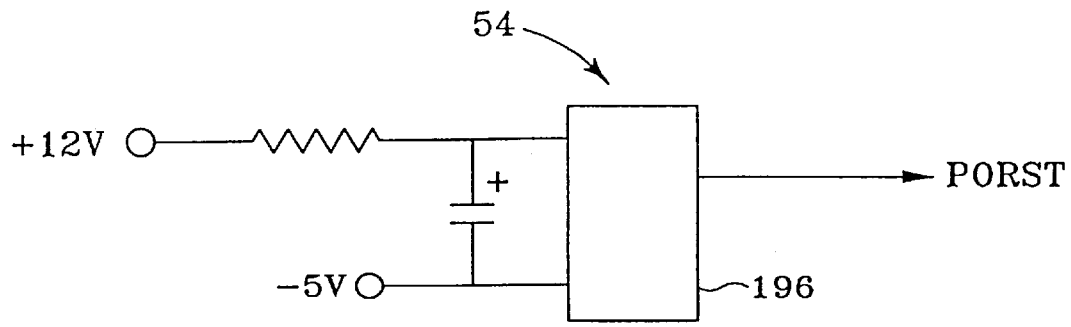
FIG. 8 is a detailed circuit diagram illustrating one embodiment of the power-on reset circuit of FIG. 4 according to the present invention.
Figure 9:
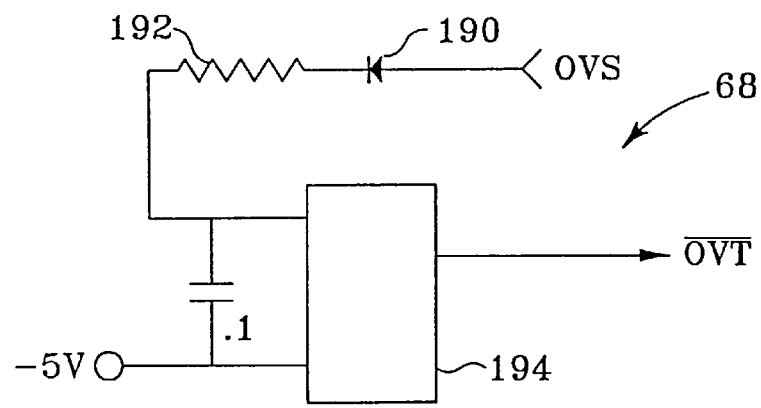
FIG. 9 is a detailed circuit diagram illustrating one embodiment of the over-voltage circuit of FIG. 4 according to the present invention.

FIG. 8 is a detailed circuit diagram illustrating the power-on reset circuit 54 of FIG. 4 which comprises a comparator and delay circuit (e.g., an MC33064 marketed by Motorola) which generates a logic high-signal PORST a fixed time after power is applied and a logic low the instant power to the control circuit drops below a preset voltage level (e.g., 4.9 volts). Power is supplied as shown from the +12 and −5 volt regulated power supply outputs. The PORST signal is coupled through one of the inverter drivers 52 to the microprocessor 100. FIG. 9 is a detailed circuit diagram of the over-voltage trip circuit 68 of FIG. 4 and is coupled to the −5 volt regulated voltage and the OVS output signal line illustrated in FIG. 7. The OVS voltage is coupled through a diode 190 and the resistor 192, as shown. These inputs are coupled to a comparator 194 (e.g., an MC33064) which generates an output signal OVT. The output signal OVT is coupled directly to the processor 100 as illustrated in FIG. 4. The comparator 194 generates a high OVT signal to the processor 100 the instant the peak voltage across the Triac 110 exceed 500 volts. The processor 110 in response to this signal will automatically switch the system 20 into a non-savings mode and turn on the main Triac 110 at the next $\overline{ZD}$ so as to provide full power and attenuate the excessive voltage excursion. If this occurs three times during a predetermined period (e.g., 15 minutes), the Triac 110 will be turned off and the fault LED will be flashed continuously.

Figure 10:
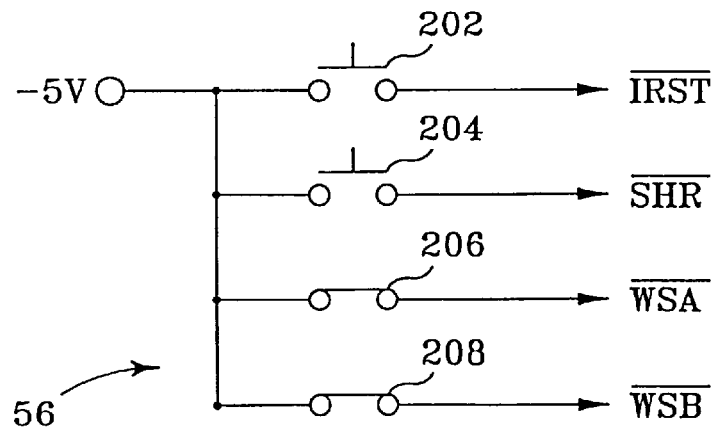
FIG. 10 is a detailed circuit diagram illustrating one embodiment of the reset circuits of FIG. 4 according to the present invention.

Referring now to FIG. 10, there is shown a detailed diagram of the reset switch and jumper circuits 56. The circuit 56 selectively applies the −5 volt regulated voltage to indicated inputs to the microprocessor 100. The push button 202, which is accessible only as an internal switch, permits accelerating the time taken for the system to go into the savings mode by coupling an $\overline{IRST}$ signal to the microprocessor 100, thereby permitting reduced production test time. A push-button switch 204 is provided which activates a 48-hour burn-in sequence by coupling a signal $\overline{SHR}$ to the microprocessor. This 48-hour burn-in sequence can only be activated once in any 2160-hour period (equivalent to three months of 24 hours of operation or nine months of eight-hour operation). Two jumper connections 206 and 208 are provided to permit selection of one of four warm-up time delays (e.g., 1.5, 3, 6 or 12 minutes) before the system will go into the savings mode by coupling one of the four binary combinations of the signals $\overline{WSA}$ and $\overline{WSB}$ directly to the microprocessor 100.

Figure 11:
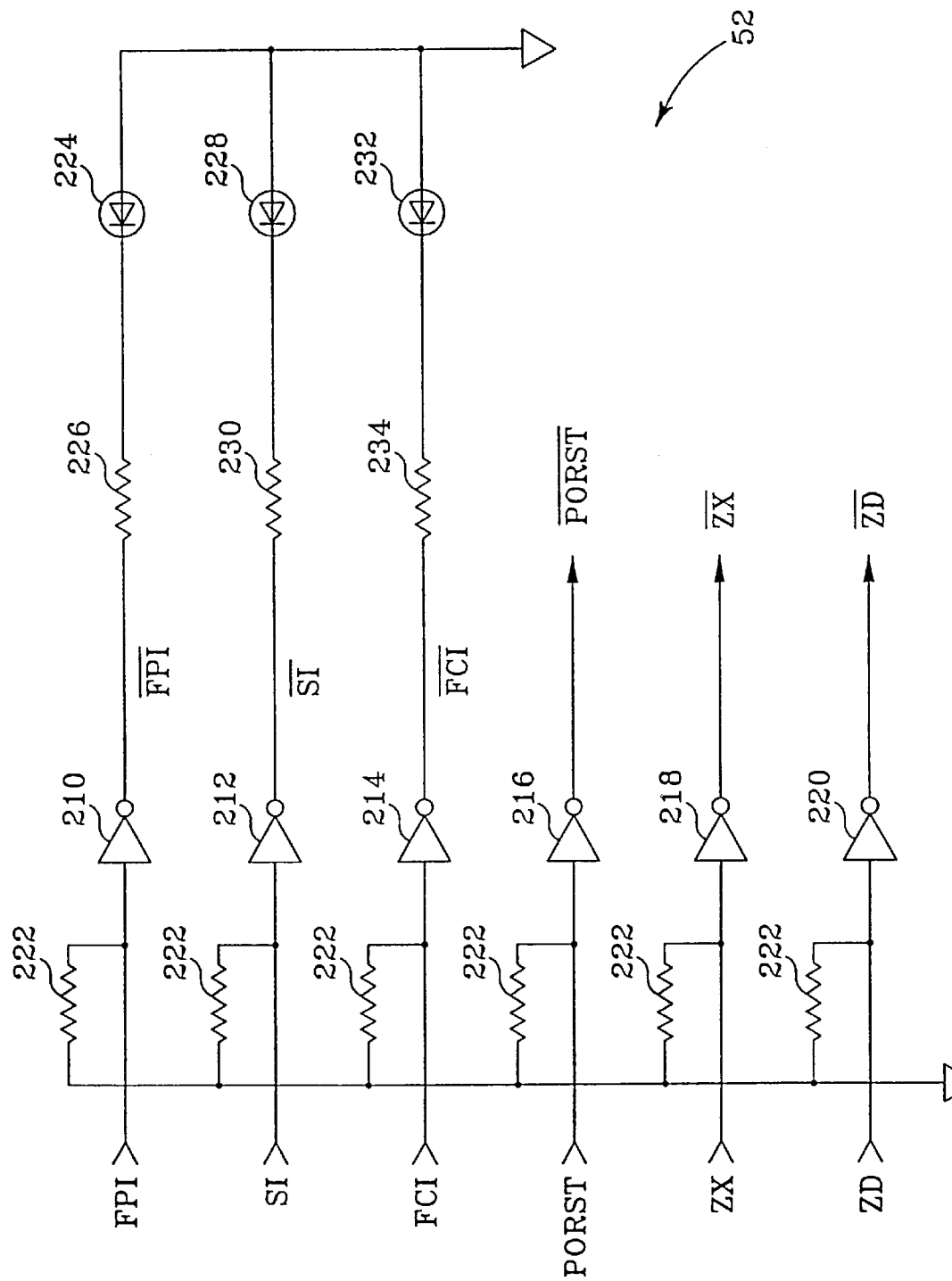
FIG. 11 is a detailed circuit diagram illustrating one embodiment of the driver circuits of FIG. 4 according to the present invention.

Referring now to FIG. 11, there is shown a detailed circuit diagram of the inverter driver circuits 52 comprising primarily a set of six inverter drivers 210–220 having a set of pull-up resistors coupled to the input of each, as shown. Coupled to the input of the inverter 210 is a signal FPI directly from the microprocessor 100. The output of the inverter 210 drives an LED 224 through a resistor 226. When the signal FPI is generated by the microprocessor, the amber LED 224 is activated providing an indication that the system is in the full power mode. A signal SI is coupled directly from the microprocessor 100 to the inverter drivers 212 to drive a green LED 228 through a resistor 230. Activation of the green LED 228 by the microprocessor 100 indicates the system is in the savings mode. A signal FCI is coupled directly from the microprocessor 100 to the inverter driver 214 to drive a red LED 232 through the resistor 234. When the red LED 232 is activated by the signal FCI, it is an indication of a fault condition. The PORST signal generated by the power-on reset circuit 54 is coupled through the inverter driver 216, thereby generating a $\overline{PORST}$ signal which is then coupled directly to the microprocessor 100 as illustrated in FIG. 4. A ZX signal is coupled from the opto-couplers 64 to the inverter driver 218 to generate a $\overline{ZX}$ signal which is then coupled directly to the microprocessor 100. The ZD signal, generated by the opto-coupler 62 illustrated in FIG. 6, is coupled directly to the inverter driver 220 which generates a $\overline{ZD}$ signal which is then coupled directly to the microprocessor 100 as illustrated in FIG. 4.

Figure 12:
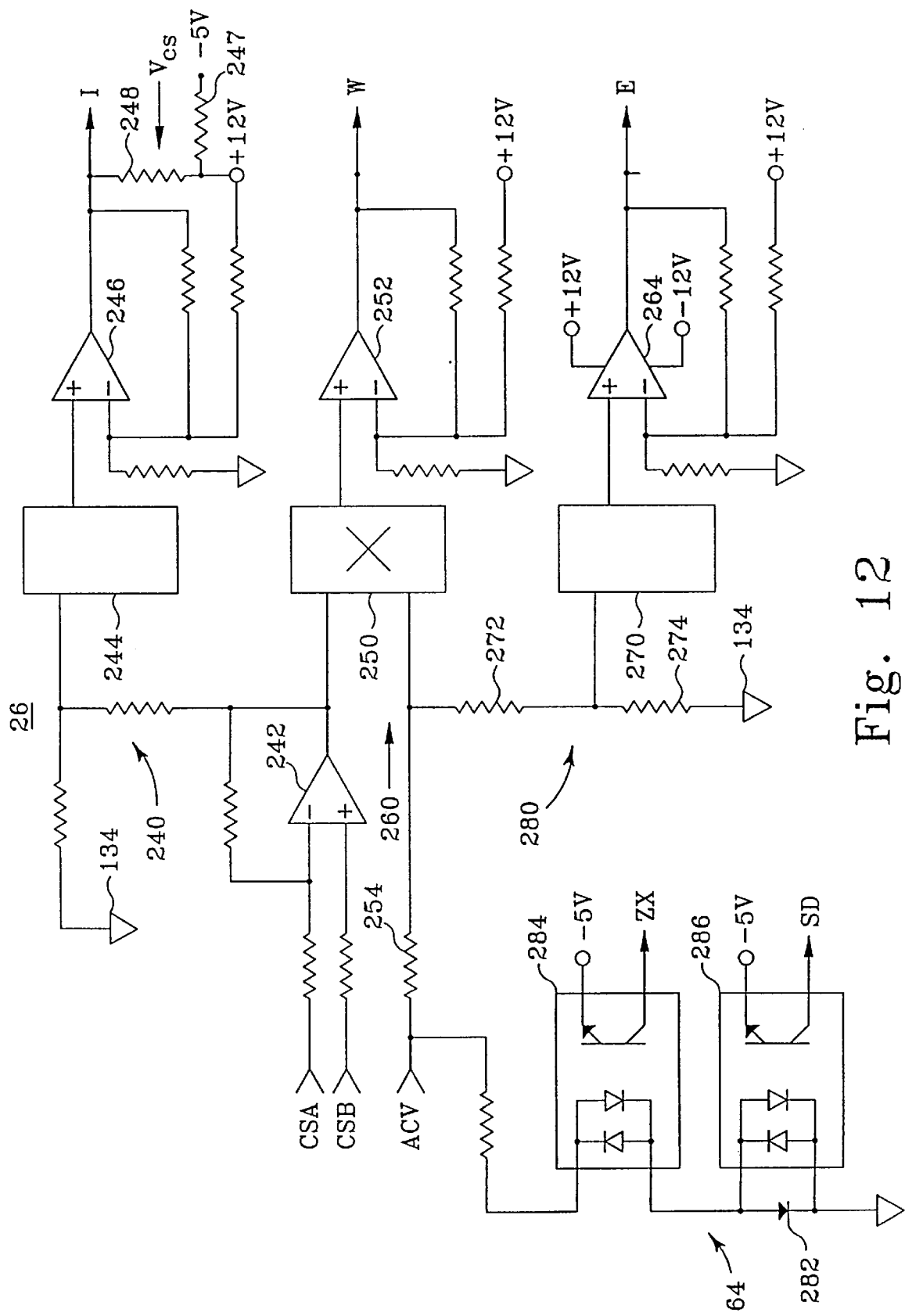
FIG. 12 is a detailed circuit diagram illustrating one embodiment of the power sense circuit of FIG. 4 according to the present invention.

FIG. 12 is a detailed circuit diagram illustrating one embodiment of the power sense circuit 26 and the opto-couplers 64 as shown in FIG. 4. The power sense circuit 26 comprises a current-sensing circuit 240, a power-sensing circuit 260 and a voltage-sensing circuit 280. The current-sensing circuit comprises an operational amplifier 242 (e.g., a LM 347 marketed by National Semiconductor Corp.) with a non-inverting input to which is coupled the signal CSB and an inverting input to which is coupled the signal CSA. CSA and CSB are the current sense signals coupled from the series resistor 76 (see FIGS. 4 and 6). The differential voltage supplied from CSA and CSB is amplified and coupled to the input of a RMS to DC circuit 244 (e.g., an AD 736 marketed by Analog Devices Corp.), as shown. This amplified current signal is thus converted from an AC signal to a DC signal representative of the RMS value which is then coupled to an operational amplifier 246 where the signal is amplified and output as the current signal I. The current signal I is coupled to the microprocessor 100 where it will be digitized. It is also coupled to one end of a potentiometer to 248. The second end of the potentiometer 248 is coupled to the −5 volt regulated voltage through a series resistor 247 while the wiper of the potentiometer 148 provides an output signal VCS. The signal VCS is coupled directly to the microprocessor 100. The VCS signal is an adjustable voltage signal proportional to the current which is used to permit adjustment of the ratio between the line current and the capacitance of the capacitor bank 58 as selected by the microprocessor 100. The circuit 240 also includes resistor networks which provide the necessary bias and gain for the circuits 242, 244 and 246, as shown.

The amplified current signal from the operational amplifier 242 is also coupled to a multiplier circuit 250 (e.g., an AD 633 marketed by Analog Devices Corp.). A second input to the multiplier 250 is the voltage signal ACV coupled through a resistor 254, as shown. The multiplier 250 is a four-quadrant multiplier that converts the voltage signal ACV and the current signal to a true power signal by multiplying the two values, and providing a resulting DC voltage signal to an operation amplifier 252 which amplifies the results and couples it to the microprocessor as a power signal W. Resistor networks provide the required bias and gain for the circuits 242, 250 and 252. The ACV signal is also coupled through voltage divider resistors 272, 274 to a RMS to DC converter 270 (e.g., an AD 736 marketed by Analog Devices Corp.) which converts the ACV signal to a precise DC voltage value representative of the RM value of the AC line voltage. The resulting DC value is amplified by an operational amplifier 264 and the resulting output voltage signal E is coupled directly to the microprocessor 100. The operational amplifiers 246, 252 and 264 each also provide a DC offset for the current, power, and voltage signal output, respectively.

Also illustrated in FIG. 12 is one embodiment of the opto-couplers 64 comprising an opto-coupler 284 and a second opto-coupler 286. The opto-coupler 284 is a bi-polar opto-coupler that provides a positive going signal ZX each time the AC line voltage goes through a zero-crossing point.

The ZX zero-crossing signal is then coupled to the inverter driver circuit 52 to generate a $\overline{ZX}$ signal which is then coupled directly to the microprocessor 100. The opto-coupler 286 is a bi-polar opto-coupler shunted by a diode 282 to provide a square wave output signal SD once per cycle such that the signal SD is high when the sine wave voltage is positive and low when the sine wave voltage is negative. This SD signal is coupled directly to the microprocessor 100 as shown in FIG. 4.

Figure 13:
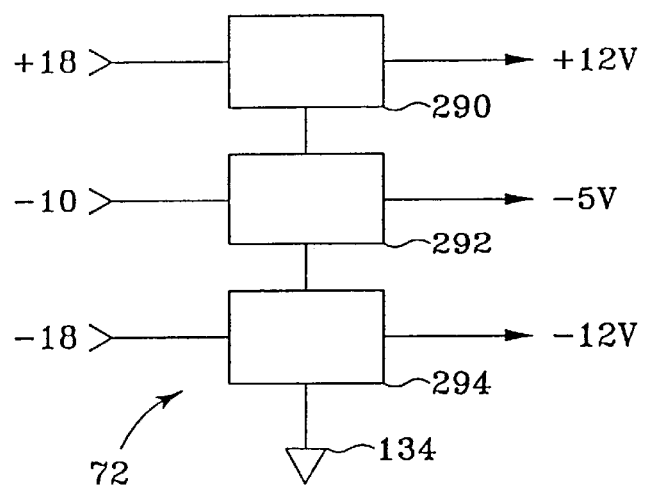
FIG. 13 is a detailed circuit diagram illustrating one embodiment of the voltage regulator circuit of FIG. 4 according to the present invention.

Referring now to FIG. 13, there is shown a detailed circuit diagram of the voltage regulator circuits 72 comprising a +12 volt regulator 290, a −5 volt regulator 292, and a −12 volt regulator 294. The regulator 290 (e.g., a MC 7812 marketed by Motorola) has an input coupled to the +18 volt filtered power supply voltage and an output +12 volt voltage which is coupled to the various circuits of FIGS. 5–12 as illustrated. The regulator 292 (e.g., a MC7905 manufactured by Motorola) has the −10 volt filtered power supply voltage applied to the input and generates therefrom a −5 volt output which is coupled to various points in the circuitry of FIGS. 5–12 as illustrated. The regulator 294 (e.g., a 7912 marketed by Motorola) has the −18 volt filtered voltage from the power supply coupled to the input and generates a −12 volt regulated voltage coupled to various points in the circuitry illustrated in FIGS. 4–12. Each is coupled and referenced, as illustrated, to the hot ground 134.

Figure 15:
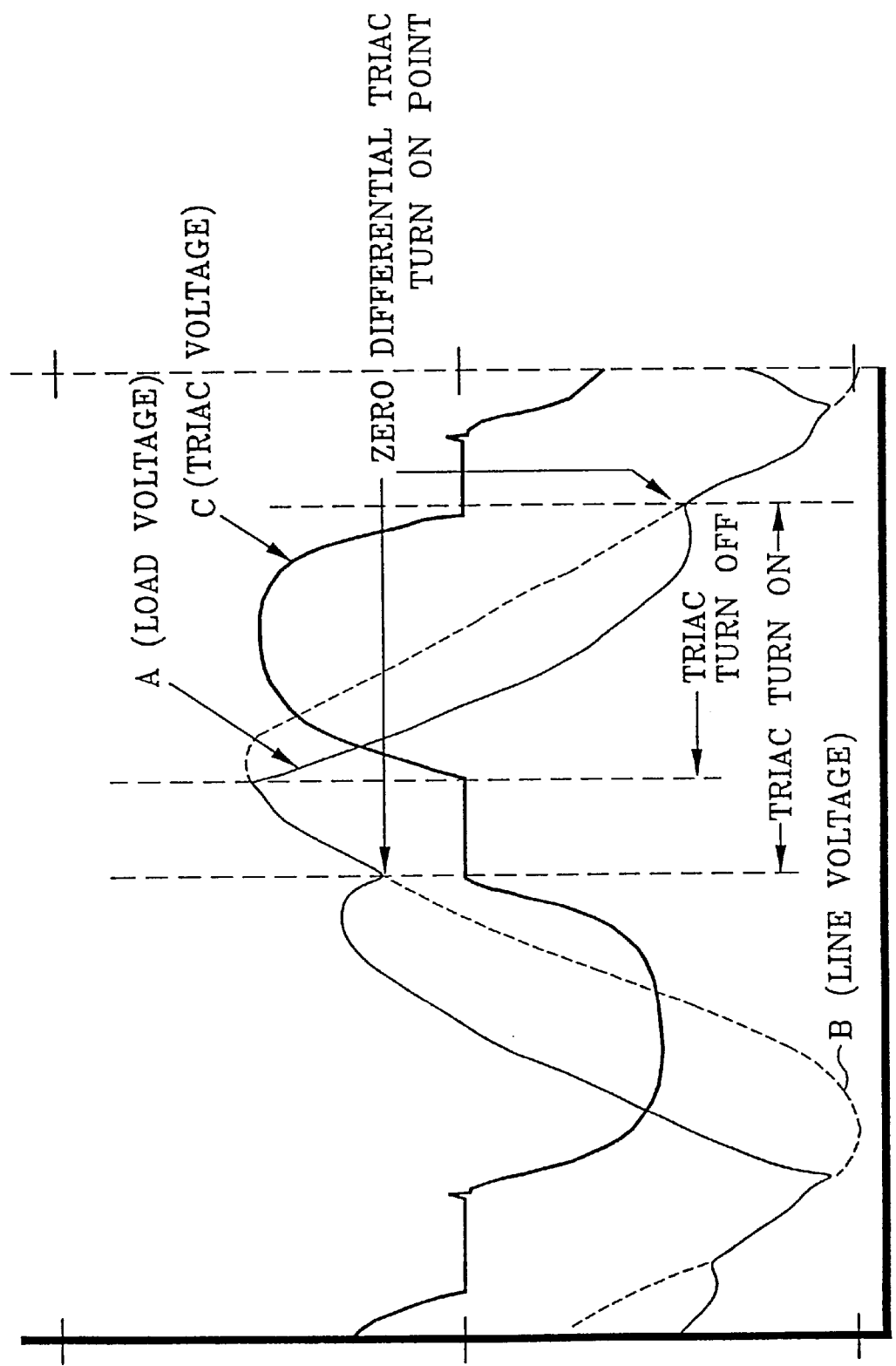

FIG. 15 illustrates three superimposed waveforms providing examples of the voltage and phase relationship of voltages generated by the system 20. The waveform A represents the voltage across the load from the load to neutral when the system 20 is in the savings mode. This waveform illustrates that there is a voltage continuing across the load (and thus current flowing through the load) after the Triac 110 has been turned off. The waveform B represents the reference AC line sine wave laid over the load waveform showing its true phase and voltage relationship. When the sine wave B is inverted and then added to the load waveform A, the result is waveform C. The waveform C represents the voltage across the main Triac 110. The flat portion is the time that the Triac 110 is conducting. The remainder of the waveform represents the voltage across the capacitor bank 34. During this time, the current is flowing through the capacitor bank 34 and the load 22. The zero differential point when the voltage across the Triac 110 is zero can be seen to occur at the illustrated points where the waveform A and waveform B intersect.

To operate the system 20 illustrated in FIGS. 4–13, power is applied, typically by closing the associated circuit breaker (not shown). Once power is applied, a $\overline{PORST}$ signal is generated after a short delay (e.g., 30 ms) which is coupled to the microprocessor 100 through the inverter 216. When the $\overline{PORST}$ signal is sensed by the microprocessor 100, the microprocessor 100 immediately performs a series of checks. The E (RMS voltage) signal is checked to determine if the line voltage exceeds specified limits (e.g., more than 20 percent above nominal). The I (RMS current) signal is checked to determine if it exceeds the predetermined limits (e.g., 25 amperes) and to determine whether the W (power) level exceeds specified predetermined limits (e.g., 3000 w). The microprocessor 100 will then also compute apparent power VA value (voltage multiplied by current) from the E and I levels which is compared to a predetermined limit (e.g., 3000 watts). If any of the predetermined limits are exceeded, an overload condition is determined to exist and all three LED's are flashed by the microprocessor 100. In order to conduct these checks, the main Triac 100 is operated in full power mode. When operated in a full power mode, the Triac 100 is turned on to its on, or conducting, state as soon as the voltage across it is detected to be approximately zero and it remains on until effectively the end of each half cycle of the AC sine wave.

During this power-on mode prior to the generation of the $\overline{PORST}$ signal, the computer is initialized, the clock is started and the AC voltages and the DC power supply voltage are allowed to build to their nominal values. While these voltages are rising, the computer output lines will be in a passive condition and will track the power supply up. Thus, all power control switches (i.e., the Triacs) are held off and there is no energy supplied to the load except that coupled through the minimum capacitor 60. Once the master clock oscillator has started and the power supplies are at their stable nominal voltages, the $\overline{PORST}$ signal will trigger the microprocessor 100 to begin. The microprocessor 100 then executes an initialization program in which the series of tests are performed, and in which a clock calendar operation may be started, and the system synchronizes itself with the power line by observing the zero-crossing signal $\overline{ZX}$. The microprocessor 100 will then respond shortly after the zero-crossing to the differential voltage signal from the opto-coupler 62 indicating that the voltage across the Triac 110 is approximately zero. In response, the microprocessor 100 will generate a low $\overline{TRIAC}$ signal to trigger the main Triac 110 into the conductive state. This operation will continue every half cycle throughout the power-on period, thereby providing the load with full power during this period.

During the power-on period if an overload condition is detected, the main Triac 110 is turned off and the three LED indicators 224, 228, 232 will be flashed at a once-per-second rate by signals generated by the microprocessor 100. Once an overload detection occurs, the system 20 must be turned off and external overload conditions corrected before reapplying power. If no overload condition is detected, the microprocessor checks the SD signal for a logical low and the $\overline{ZX}$ signal for a logical low which indicates that the zero crossing has occurred. Then, the microprocessor generates a $\overline{TRIAC}$ signal in response to a low $\overline{ZD}$ signal from the opto-coupler 62 and inverter 220. The microprocessor 100 only generates a low $\overline{T01}$ signal sometime during the time that the signal SD is high and, similarly, only generates a low $\overline{T02}$ signal sometime while the SD signal is low. $\overline{T01}$ is low or $\overline{T02}$ is low to turn off the Triac 110 by activating the pulse switch circuit 36. These signals are timed to occur just before the next $\overline{ZX}$ signal so that the Triac 110 turns off just before the zero-crossing point during the power-on period.

Once the power-on mode has been completed, the microprocessor 100 starts a countdown counter to time a preselected warm-up period. The warm-up period in the illustrated embodiment may be one of four preselected time period (e.g., 1.5, 3, 6 or 12 minutes) which may be selected by the jumpers 206, 208 depending upon the type of load to be operated. During the warm-up period, the computer continues to operate the Triac 110 in a full power mode. During the warm-up period, the microprocessor 100 samples the RMS current I, the RMS voltage E, and the power signal W, and then digitizes and stores these values. This procedure is repeated each sample period (e.g., 32 secs.) with the most recent data being compared with that of the two prior samples until a stable average value is obtained (e.g., the values within one percent). At the end of the time-out interval, the next two reading will be stored in storage locations so they can be compared with the current reading. If the data at time-out of the warm-up period is not stable to within one percent of the current values, then the time-out interval will be extended another 32 seconds and the measurement sequence will be repeated. The final measured current, voltage and power values are averaged with the previous two to establish reference levels and to establish a value for the switched capacitor selection signal VCS and, thus, the amount of capacitance provided by the capacitor circuit 34. The reference average stable power reading is then stored and 75 percent of this value is calculated and stored in a memory location by the microprocessor 100. In this warm-up period, the microprocessor checks the 48-hour and 90-day mode status. If in the 48-hour mode, then the system does not go into the savings sequence; and, if the system is in the 90-day mode, or neither mode, then the microprocessor 100 proceeds into the savings mode.

The 48-hour mode is entered when the 48-hour burn-in button 204 is pressed. A 48-hour counter is activated and incremented after each one-hour period of operation. This information is stored in a non-volatile memory (EEPROM 102) and if the power is removed and reapplied, then the microprocessor 100 will read the data stored in the EEPROM 102 and continue its timing and counting process where it last lost power. When a 48-hour count is reached, the system 20 is then permitted to go into the savings mode. The 48-hour push button 204 cannot cause reactivation of the 48-hour counter after the first time it was pressed until the full 90-day period has elapsed.

Once the initial 48-hour period has elapsed, then the same counter timer counts hours and, at the end of each 48 hours of operation, it increments the day counter by two days, thus 90 days is equal to 2,160 hours of operation (equal to nine months of eight-hour days of operation). At the end of this 90-day period, the EEPROM 102 is cleared and the push button circuit for the 48-hour mode may be again activated to permit the next 48-hour burn-in period. When in the 48-hour burn mode, the amber full-power LED indicator 224 is flashed at a once-per-second rate. When in the 90-day mode, the amber LED indicator 224 is flashed at a once-every-three-second rate. When the amber LED indicator 224 does not flash, it is an indication that the system is ready to accept another 48-hour burn-in cycle.

If the system is not in a 48-hour mode, then immediately after the completion of the warm-up period (i.e., the warm-up countdown counter has elapsed), the system 20 proceeds to the transition to savings mode. During this period of transition, the conduction angle of the main Triac 110 is gradually shortened until the computed savings from the warm-up period is reached. When the transition mode is entered, the VSC signal coupled to the microprocessor 100 is sampled and used to select the appropriate capacitor value. For example, the capacitor value may be directly related to the amount of current detected so that, in the illustrated embodiments, for one amp of current, the capacitance value selected could be 10 μf, while for 15 amps of current, the selected value would be 150 μf. The exact ratio can be selected by adjusting the position of the wiper of the potentiometer 248 shown in FIG. 12. Once the capacitance value is determined, the microprocessor 100 determines the combination of signals $\overline{CA1}$ to $\overline{CA8}$ activate the proper combination of capacitors to obtain the desired capacitance value and generate $\overline{CA1}$ to $\overline{CA8}$ accordingly. For example, a capacitance value of 30 μf could be selected by activating $\overline{CA1}$ and $\overline{CA2}$, thereby turning on the Triac 122 and 124 in FIG. 6.

When the capacitors have been switched to the proper combination, the microprocessor 100 begins shifting the $\overline{TRIAC}$ drive signal turn-off point and the turn-off control signals $\overline{T01}$ and $\overline{T02}$ to occur progressively sooner until the 75 percent of full power point is reached. In the illustrated embodiment for a 60-hertz line, this is accomplished by setting a timer initially with a time of approximately 8.3 milliseconds such that the Triac 110 is turned off approximately 8.3 milliseconds after it is turned on, thereby keeping the Triac 110 on substantially all of both of the AC sine wave half cycles. The conduction angle of the Triac 110 is reduced by reducing the counter time period by 10.2 microsecond increments for each cycle of the AC signal. Thus, it takes about 13.6 seconds at 60 hertz to reduce the conduction time to near zero. The present value of the power is measured after each shortening and compared to the stored value. Once the stored value and the measured value are equal, the slewing of the timer stops. The system 20 then switches to the pure savings mode of operation. At the beginning of this transition mode, the switched capacitor bank 58 is brought to the final value. During this procedure, the capacitor Triacs 122–128 are triggered at the main Triac 110 near-zero voltage switch points.

Once the system is in the savings mode and is at equilibrium and at the approximately 75-percent power level based on the stored nominal power value, the system 20 simply tracks changes by monitoring the line voltage and current and making the necessary adjustments to maintain the 75-percent power level. If there is a small change in power due to a change in line voltage, then the conduction time of the triggerable switch 32 will be adjusted to reestablish the reference power and 75-percent power level. If the change is due to a change in current and the change in current is small (e.g., two amperes for a 120-v, or one ampere for a 277-v system), then the adjustment will be the same as for a voltage change. If the load current changes are major (e.g., greater than two amps at 120 v., etc.), the system 20 will recycle to the warm-up mode wherein a new capacitance value will be chosen and the reference power will be recomputed and stored in the reference power memory location. The system 20 also monitors the peak voltage across all power-switching devices at all times; and, if at any time they exceed a 500-volt peak, then the system instantly goes out of the savings mode and rechecks all parameters for a possible fault condition.

The process of going out of the savings mode takes approximately the same amount of time as going into the savings mode so that the effect on the load is minimized. However, an excessive voltage condition of more than 500 v across the controlling power devices represents a destructive fault condition and, thus, stopping the savings mode under this condition must take place immediately to prevent damage to the solid-state devices. If this excessive voltage condition occurs three times within a 15-minute period, then a fault condition will be signalled by flashing the red LED indicator. The load must then be disconnected and the system serviced.

Before and during the savings mode, the Triac 110 turn-on signal $\overline{TRIAC}$ is low for varying periods of time. This signal $\overline{TRIAC}$ goes low at the instant $\overline{ZD}$ signal goes low and goes high at the instant of the $\overline{T01}$ or $\overline{T02}$ signal going low. The $\overline{ZD}$ signal going low also causes the start of a countdown timer that activates the turn-off signal $\overline{T01}$ or $\overline{T02}$ and causes the $\overline{TRIAC}$ signal to go high at the end of its counting cycle. The maximum duration of the timer is 8.3 milliseconds for the 60-hertz line frequency and 9.8 milliseconds for the 50-hertz line frequency. Line frequencies from 48 through 63 hertz can be accommodated automatically by varying the maximum time between 10.42 milliseconds and 7.94 milliseconds. For the 60-hertz line frequency operation, the 8.3-millisecond period causes the turn-off to occur just before the next zero crossing at a point that has no effect on power. Thus, the process of going into or out of savings is accomplished by reducing or increasing the counter time period in 10.2-microsecond increments each cycle or 5.1 each half cycle of the AC sine wave for a 612-microsecond change each second. The maximum range of control will be 8.3 milliseconds and takes approximately 13.6 seconds to complete. The half-cycle period cannot be exceeded because the counter will be automatically reset by the next $\overline{ZD}$ signal. Once power equilibrium is reached, the counter period will be maintained approximately constant and variations in line voltage will cause changes in the counter period to compensate so as to maintain a constant savings level of the calculated 25 percent. Other desired values of savings can be obtained by appropriate programming of the microprocessor 100.

Figure 16:
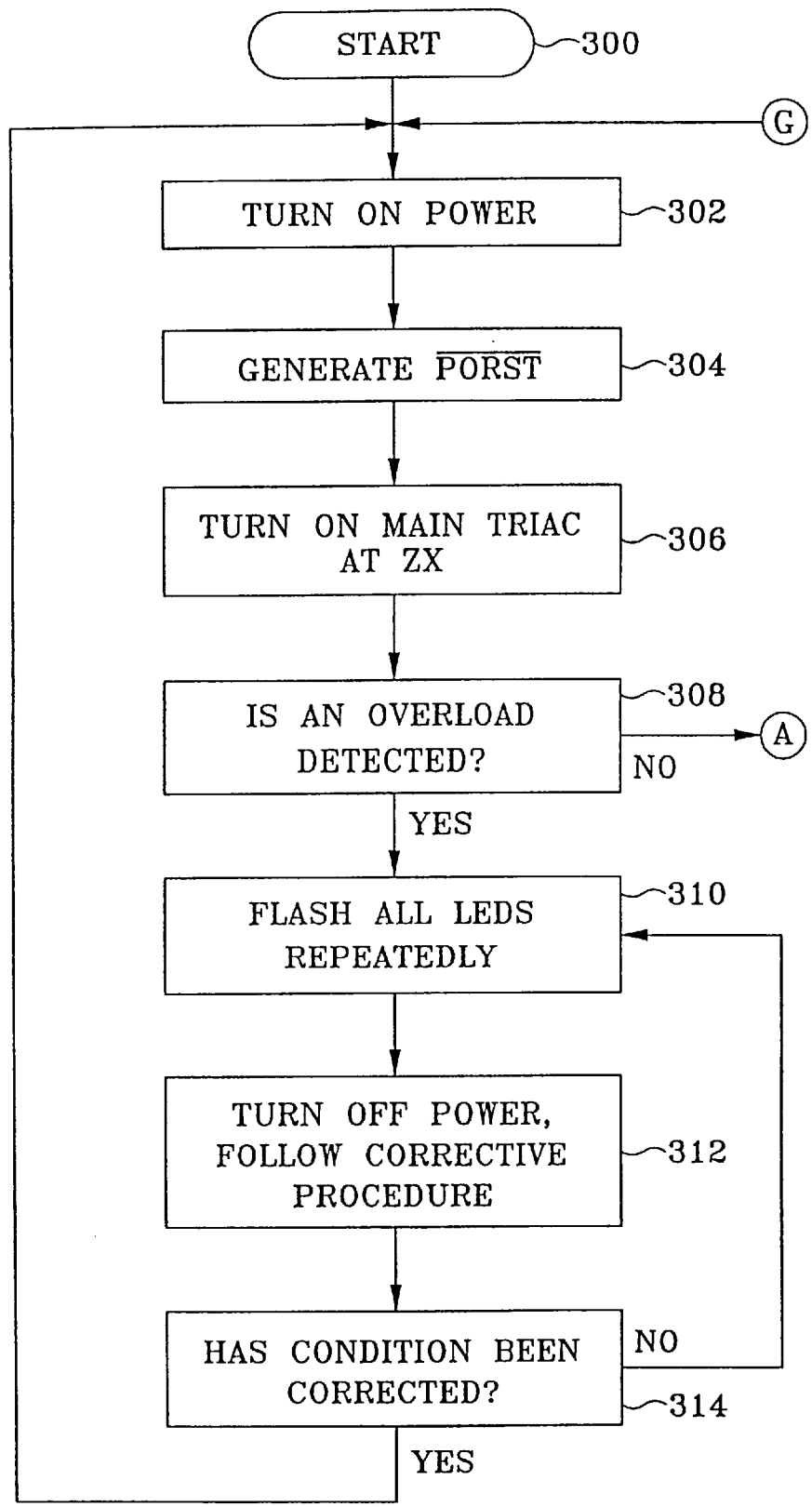
FIGS. 16 through 20 are detailed flow charts illustrating the functional operation of the system and the programmed microprocessor for one embodiment of FIG. 5.
Figure 17:
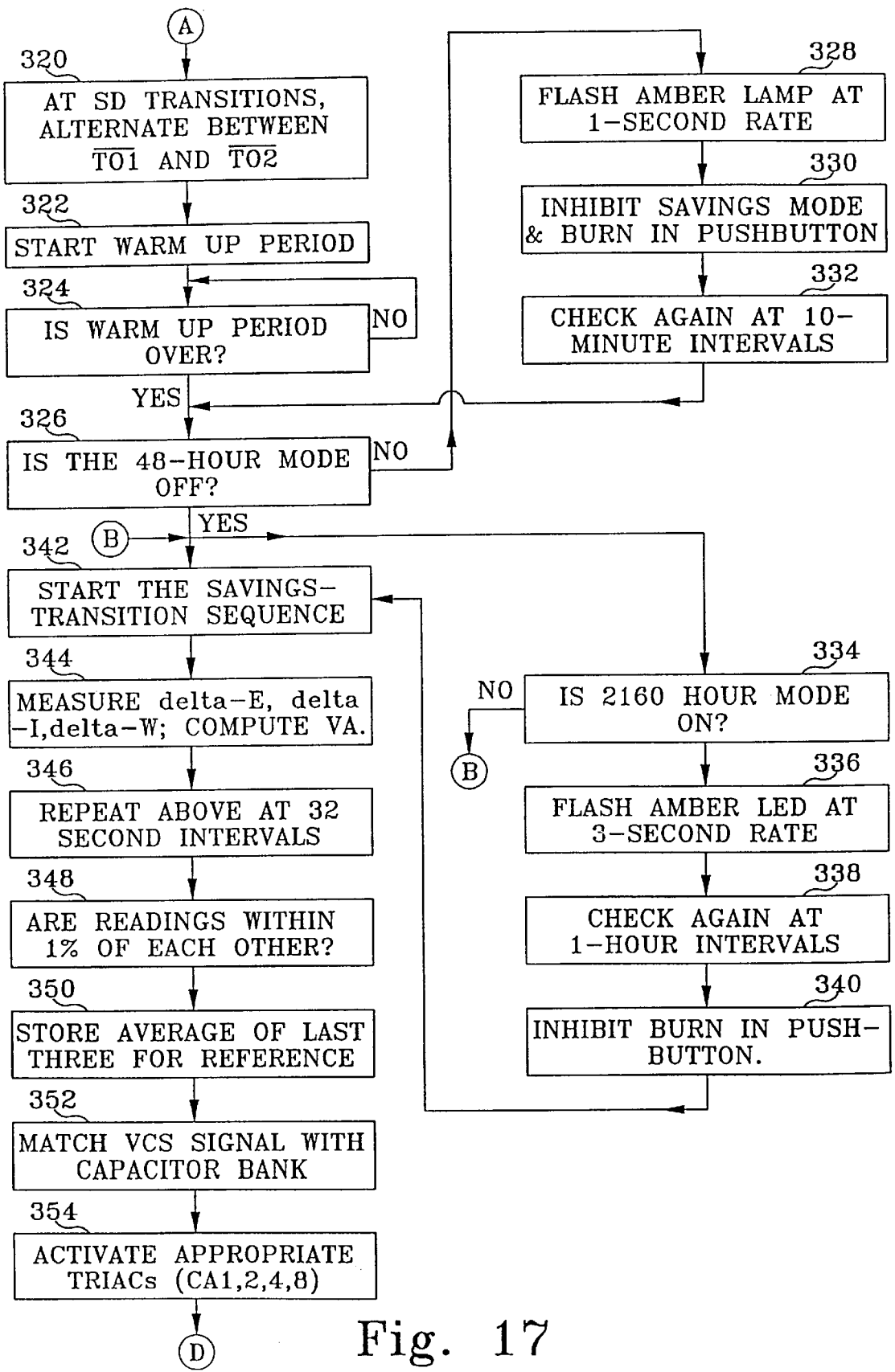

Referring now to FIGS. 16–22, there are shown detailed flowcharts illustrating the functional operation and logical flow of the programmed microprocessor 100 and system 20 for one embodiment of the system 20 according to the invention. As illustrated in FIG. 16, functional flow begins at the start position 300 after which the turn-on of power, indicated at block 302, results shortly thereafter in the generation of the $\overline{PORST}$ signal as indicated at block 304. Immediately after the generation of the $\overline{PORST}$ signal, the microprocessor 100 turns on the main Triac 110 after receiving the $\overline{ZX}$ signal as indicated in block 306 and the microprocessor 100 then tests for an overload condition as indicated in block 308. If no overload is detected, program control branches to point A which is illustrated in FIG. 17. If an overload is detected, the three LED's 224, 228 and 232 are flashed repeatedly as indicated at block 310. As indicated at block 312, the system 20 should then be turned off and afterwards, if the condition has been corrected as indicated at block 314, the system 20 is restarted, returning to the power-on step 302. If the condition has not been corrected, all the LED's are flashed repeatedly and the system must be again turned off and the cause of the overload condition corrected.

As illustrated at block 308, if an overload is not detected, processing flow proceeds to point A illustrated in FIG. 17. The processor begins alternately generating the $\overline{T01}$ and $\overline{T02}$ signals at the $\overline{SD}$ transitions as indicated at block 320. The warm-up period is then started as indicated at block 322 and at block 324, the countdown timer is checked to determine if the warm-up period is over. If the warm-up period is not over, the warm-up continues; and, if the warm-up is over, then the 48-hour mode is checked to determine if it is activated as illustrated at block 326. If the 48-hour mode is activated, then the amber LED is flashed at the one-second rate, and both the savings mode and the burn-in push-button response are inhibited as illustrated by blocks 328 and 330. The 48-hour clock is then again checked after a 10-minute interval and if the 48-hour mode is completed, the system 20 then proceeds to a determination if a 2160-hour period mode is on as indicated at block 334. If yes, the amber LED is flashed at a three-second rate as indicated in block 336. This mode is checked at one-hour intervals and the burn-in push button is inhibited as indicated at blocks 338 and 340. Process flow then branches back to block 342. At block 334, when the 2160-hour mode is tested, if the 2160-hour mode is over, the flow branches to point B wherein the savings transition sequence is started as indicated at block 342. The transition sequence begins with the measurement of E, I and W and the computation of the voltage times current value and this process is repeated at 32-second intervals as indicated by blocks 344 and 346. The readings are then checked to determine if they are within one percent of each other and, if so, the average of the last three are stored for reference as indicated in blocks 348 and 350. The VCS signal is read and used to determine the value of capacitance required for the capacitor bank and the required combination of Triac trigger signals is generated based thereon, as indicated in blocks 352 and 354.

Figure 18:
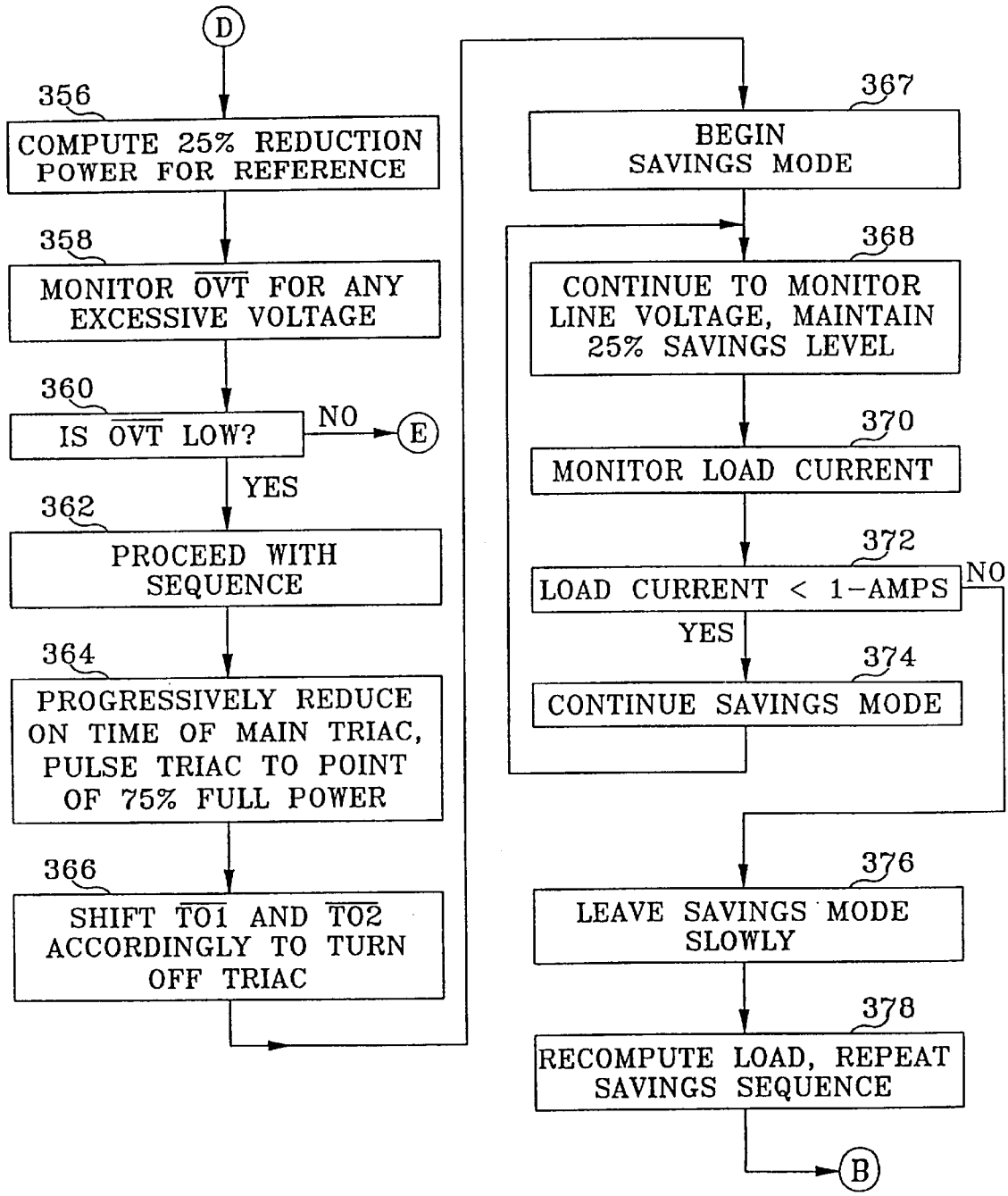

Process flow then proceeds to point D illustrated in FIG. 18 wherein the 75-percent power level is calculated and stored as indicated in block 356. The OVT signal is monitored for excessive voltage as illustrated by block 358, and if the OVT signal is low, then the system proceeds with the transition sequence as illustrated by blocks 360 and 362. If the OVT signal is high, then processing control branches to point E illustrated in FIG. 19. If the savings sequence continues, then the microprocessor 100 progressively reduces the time of conduction to the main Triac until the 75-percent power level is reached as indicated in block 364 and the $\overline{T01}$ and $\overline{T02}$ are alternately produced according to the turn-off time determined at block 364 and indicated at block 366. The savings mode is then entered at block 367 and line voltage is then continually monitored to maintain the 75-percent power level as indicated at block 368 and the load current is similarly monitored to determine if it maintains a value within a predetermined limit (e.g., approximately two amps at 120 v and one amp at 277 v), as indicated in block 372. If the current changes less than the predetermined limit, then the savings mode continues and process flow branches back to block 368 for continuation of the savings mode as indicated by block 374. If the current changes more than the predetermined limit, then process control branches to block 376 and the system leaves the savings mode slowly and resamples the voltage, current, and power levels, recomputes a new power load level, and reenters the savings sequence at point B as indicated by block 378.

Figure 19:
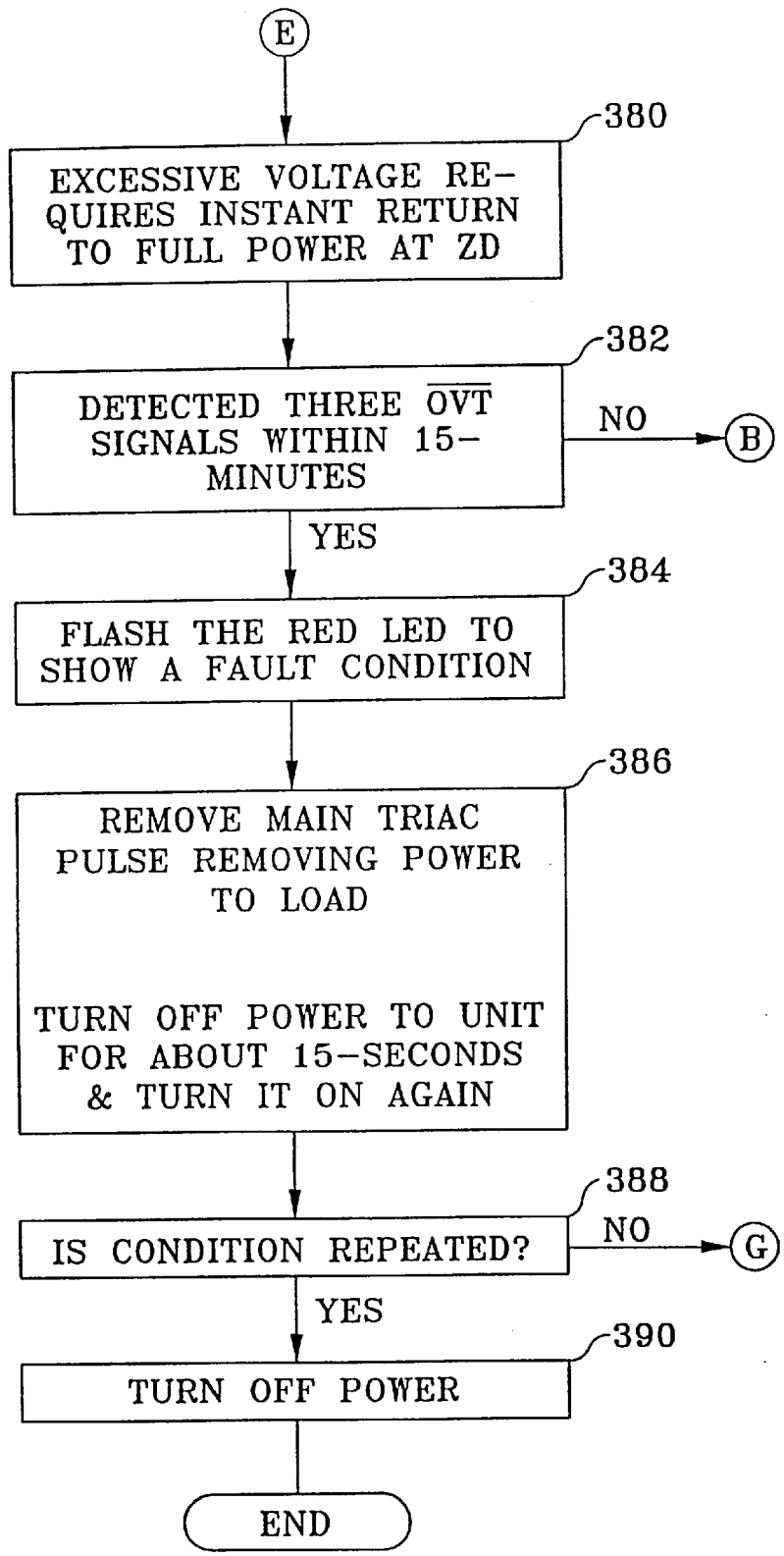

The program sequence may branch to point E illustrated in FIG. 19 when the detection of the over-voltage signal OVT (see FIG. 18, block 360) results in the microprocessor 100 returning to the full power activation of the Triac 110 as indicated at block 380. If three excessive voltage conditions are detected within 15 minutes, the system flashes the red LED to show a fault condition as illustrated by blocks 382 and 384. If the OVT signal is not detected three times within 15 minutes, then the system enters into the normal savings sequence, entering the sequence at point B (see FIG. 17) illustrated at block 382. Once the LED flashes to indicate the fault condition, after three detections as illustrated at block 384, the main Triac 110 is turned off, removing power to the load and the unit is required to be turned off as indicated in block 386. When the unit is turned on, if the condition of fault is repeated, power must be again turned off to permit servicing as indicated at blocks 388 and 390. If the condition of fault is not repeated at block 388 when the unit is turned on again, then process control branches to block 302 where the power-on sequence is begun again.

Figure 20:
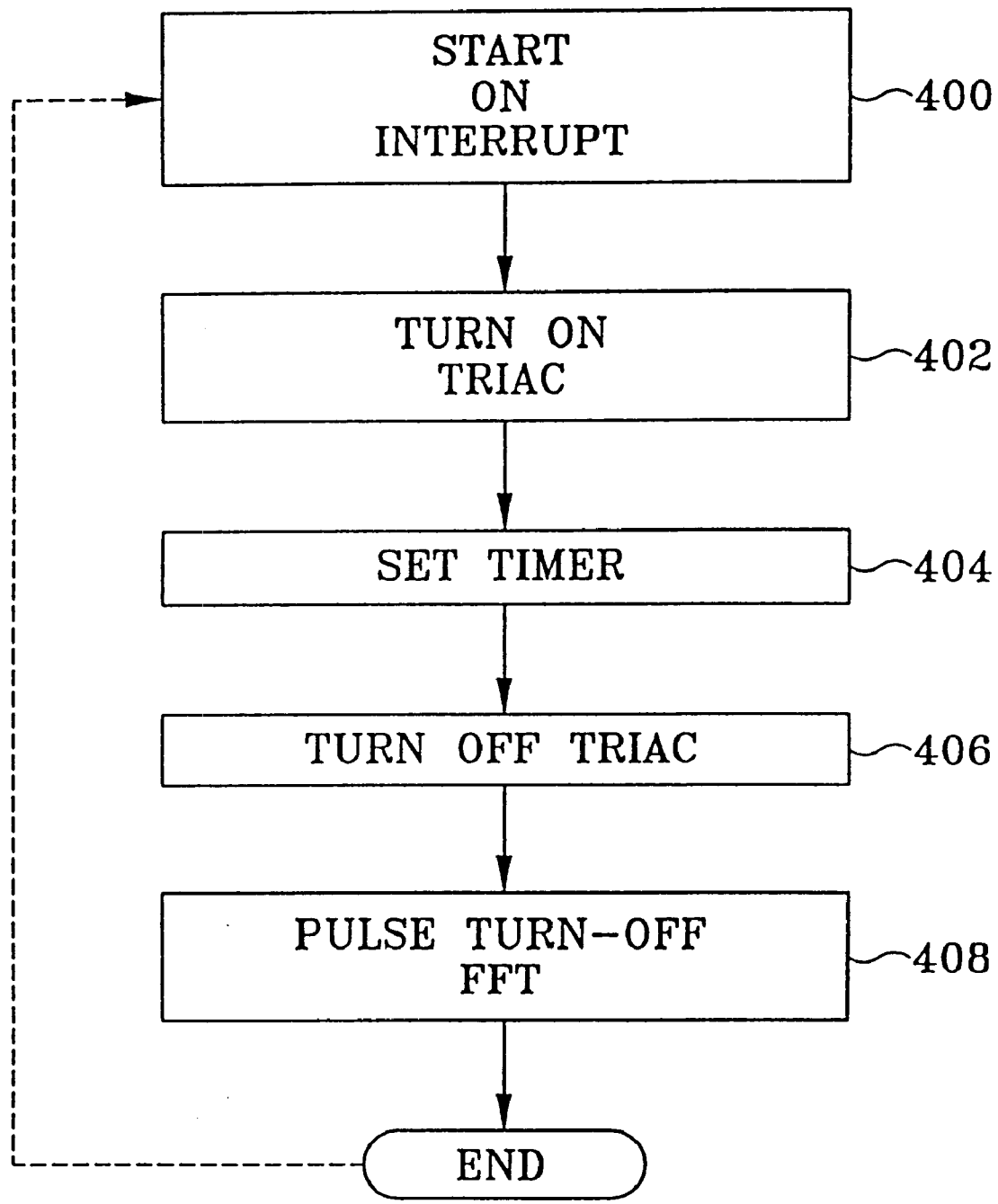

During both the warm-up mode and the savings mode, the Triac 110 is switched in accordance with the sequence shown in FIG. 20. The switching sequence starts with receiving the $\overline{ZD}$ interrupt as indicated at block 400 and immediately turns on the Triac 110 as indicated at block 402. The Triac 110 is turned on by the microprocessor 100 which generates the $\overline{TRIAC}$ signal and the microprocessor 100 immediately sets the conduction timer as indicated at block 404. When the timer times out, the microprocessor 100 removes the $\overline{TRIAC}$ signal to permit the Triac 110 to be turned off as indicated at block 406, and generates the appropriate $\overline{T01}$ and $\overline{T02}$ signal to turn off the Triac as indicated at block 408. The sequence is then repeated upon the reception of the next $\overline{ZD}$ interrupt.

Embodiments of the novel method and apparatus of power regulation for reducing energy consumption have been described for the purpose of illustrating the manner in which the invention may be made and used. It should be understood, however, that implementation of other variations or modifications of the invention in its various aspects will be apparent to those skilled in the art, and that the invention is not limited by the specific embodiments described. It is, therefore, contemplated to cover the present invention and all modifications, variations or equivalents that fall within the true spirit and scope of the basic underlying principles disclosed and claimed herein.

I claim:

1. An AC power regulation system for controlling load power to a load, said power regulation system having an input for coupling to an AC power source and having an output for coupling to the load, said power regulation system comprising:

a controllable switch coupled in series between the input and the output;

circuitry for supplying selectable capacitance coupled in parallel with the controllable switch;

circuitry for turning-on the controllable switch to a conducting state;

circuitry for turning-off the controllable switch to a non-conducting state; and switch control circuitry for generating control signals to control said circuitry for turning-on and said circuitry for turning-off such that the controllable switch is turned on to a conducting state at a selected turn-on time, and is turned off to a non-conducting state at a selected turn-off time prior to a line current zero-crossing point, said turn-off time being selected by said switch control circuitry in response to a reference signal.

2. The system of claim 1 wherein the selectable capacitance comprises a capacitance that is proportional to the line current and operable to pass the line current during a substantial portion of a half cycle of the line current.

3. The system of claim 2 wherein the capacitance comprises at least 100 uF.

4. The system of claim 2 wherein the capacitance is sufficiently large so that current conduction avoids a ringing effect.

5. The system of claim 1 further comprising circuitry for ensuring that said turn-off time initially occurs just in advance of a line current zero-crossing point.

6. The system of claim 1 further comprising circuitry for generating the reference signal.

7. The system of claim 6 wherein the reference signal is responsive to load power.

8. The system of claim 6 wherein the reference signal is responsive to a feedback control measurement.

9. A power regulation apparatus for an electrical system having an AC power source and a load having a combination of resistive and reactive impedances, the apparatus comprising:

switching circuitry coupled to the AC power source and to the load, the switching circuitry modifying a waveform applied to the load, said load waveform having substantially the same peak value of an AC power source waveform and a substantially lower RMS value than the AC power source waveform;

a variable capacitance connected in series between the AC power source and the load;

measurement circuitry that measures load current; and control circuitry that selects a first capacitance from the variable capacitance based on a load current measurement.

10. A power regulation apparatus for fluorescent and other ballasted lighting systems having an AC power source and a load having a combination of resistive and reactive impedances, the apparatus comprising:

switching circuitry coupled to the AC power source and to the load, the switching circuitry modifying a waveform applied to the load, said load waveform having a substantially lower RMS value than the AC power source waveform while maintaining a peak value sufficient to minimize light intensity loss;

a variable capacitance connected in series between the AC power source and the load;

measurement circuitry that measures load current; and control circuitry that selects a first capacitance from the variable capacitance based on a load current measurement.

11. An AC power regulation system for controlling load power to a load, said power regulation system having an input for coupling to an AC power source and having an output for coupling to the load, said power regulation system comprising:

a controllable switch coupled in series between the input and the output;

circuitry for supplying a selectable capacitance coupled in parallel with the controllable switch, the capacitance being proportional to the line current and operable to pass the line current during a substantial portion of a half cycle of the line current;

circuitry for turning-on the controllable switch to a conducting state;

circuitry for turning-off the controllable switch to a non-conducting state; and switch control circuitry for generating control signals to control said circuitry for turning-on and said circuitry for turning-off such that the controllable switch is turned on to a conducting state at a selected turn-on time, and is turned off to a non-conducting state at a selected turn-off time prior to a line current zero-crossing point, said turn-off time being selected by said switch control circuitry in response to a reference signal.

12. An AC power regulation system for controlling load power to a load, said power regulation system having an input for coupling to an AC power source and having an output for coupling to the load, said power regulation system comprising:

a controllable switch coupled in series between the input and the output;

circuitry for supplying a capacitance coupled in parallel with the controllable switch; the capacitance being proportional to the line current and operable to pass the line current during a substantial portion of a half cycle of the line current;

circuitry for turning-on the controllable switch to a conducting state;

circuitry for turning-off the controllable switch to a non-conducting state;

switch control circuitry for generating control signals to control said circuitry for turning-on and said circuitry for turning-off such that the controllable switch is turned on to a conducting state at a selected turn-on time, and is turned off to a non-conducting state at a selected turn-off time prior to a line current zero-crossing point, said turn-off time being selected by said switch control circuitry in response to a reference signal; and circuitry for ensuring that said turn-off time initially occurs just in advance of a line current zero-crossing point.

13. An AC power regulation system for controlling load power to a load, said power regulation system having an input for coupling to an AC power source and having an output for coupling to the load, said power regulation system comprising:

a controllable switch coupled in series between the input and the output;

circuitry for supplying a capacitance coupled in parallel with the controllable switch, the capacitance being proportional to the line current and operable to pass the line current during a substantial portion of a half cycle of the line current;

circuitry for turning-on the controllable switch to a conducting state;

circuitry for turning-off the controllable switch to a non-conducting state;

switch control circuitry for generating control signals to control said circuitry for turning-on and said circuitry for turning-off such that the controllable switch is turned on to a conducting state at a selected turn-on time, and is turned off to a non-conducting state at a selected turn-off time prior to a line current zero-crossing point, said turn-off time being selected by said switch control circuitry in response to a reference signal; and circuitry for generating the reference signal.

14. The system of claim 13 wherein the reference signal is responsive to load power.

15. The system of claim 13 wherein the reference signal is responsive to a feedback control measurement.

* * * * *